US012789898B2

(12) United States Patent
Farris

(10) Patent No.: US 12,789,898 B2
(45) Date of Patent: Nov. 10, 2026

(54) COMPACTIBLE VEHICLE

(71) Applicant: Jack Mitchell Farris, Parkland, FL (US)

(72) Inventor: Jack Mitchell Farris, Parkland, FL (US)

( * ) Notice: Subject to any disclaimer, the term of this patent is extended or adjusted under 35 U.S.C. 154(b) by 0 days.

(21) Appl. No.: 19/342,609

(22) Filed: Sep. 28, 2025

(65) Prior Publication Data

US 2026/0184372 A1 Jul. 2, 2026

Related U.S. Application Data

(62) Division of application No. 19/007,533, filed on Jan. 1, 2025, now Pat. No. 12,428,061.

(51) Int. Cl.
*B62D 21/14* (2006.01)
*B62D 61/12* (2006.01)

(52) U.S. Cl.
CPC ............ *B62D 21/14* (2013.01); *B62D 61/12* (2013.01)

(58) Field of Classification Search
CPC ................................ B62D 21/14; B62D 61/12
See application file for complete search history.

(56) References Cited

U.S. PATENT DOCUMENTS 3,693,692 A * 9/1972 Branick .................. B60C 25/02 157/1.17
3,894,748 A * 7/1975 Ratcliff ..................... B62B 3/10 D34/21
4,917,401 A * 4/1990 Iwaki ...................... B62B 1/125 280/655
6,283,238 B1 * 9/2001 Royer ..................... B62B 3/022 280/DIG. 6
6,793,223 B2 * 9/2004 Ondrasik ............ B60B 33/0039 280/47.35
7,055,847 B2 * 6/2006 Miller ..................... B62B 3/022 248/161
7,832,746 B2 * 11/2010 Peterson .................. B62H 1/12 280/30
11,001,285 B1 * 5/2021 Gayk ...................... B62B 1/002
2004/0173980 A1 * 9/2004 Yang ....................... B62B 1/045 280/47.26
2006/0214382 A1 * 9/2006 Liao .......................... B62B 3/12 280/47.16
2015/0028568 A1 * 1/2015 Tran ....................... A63B 55/57 280/641
2016/0033095 A1 * 2/2016 Kennedy ................ F21L 13/00 362/192
2018/0009455 A1 * 1/2018 Noonan .................... B62B 1/26
(Continued)

OTHER PUBLICATIONS

Andersson et al., G. Design and Development of a Foldable Motorized Micro-Haulage Vehicle, Google Scholar, Division of Innovation, Department of Design Sciences, Faculty of Engineering LTH, Lund University, Master Thesis, 2023, pp. 1-108. (Year: 2023).*

*Primary Examiner* — Russell Frejd

(57) ABSTRACT

An apparatus includes a core and multiple wheel systems. For each of the multiple wheel systems, a wheel is attached to each end of a rotatable axle. The apparatus includes support legs. The support legs are connected to the core and a horizontal-motion-enabling device is attached to at least one support leg. The apparatus includes sides. The sides are connected to the core. The apparatus includes a computing device.

19 Claims, 29 Drawing Sheets

(56) References Cited

U.S. PATENT DOCUMENTS

| | | | | |
|---|---|---|---|---|
| 2018/0073691 | A1 * | 3/2018 | Kennedy | E04H 12/345 |
| 2019/0258274 | A1 * | 8/2019 | Perkins | B25J 9/162 |
| 2022/0081019 | A1 * | 3/2022 | Ye | B62B 9/18 |
| 2023/0398922 | A1 * | 12/2023 | Hashimoto | B60P 1/483 |

* cited by examiner

COMPACTIBLE VEHICLE

BACKGROUND

Various types of carts and other vehicles (e.g., storage carts, golf carts, cars, trucks, toy cars, etc.), when not in use, may be stored in a garage, storage unit, or other location. The storage area may be limited in size making it a challenge to store the cart along with other stored items. Presently, many types of carts and vehicles cannot be easily reduced in size so that it can be stored in areas with limited space.

DETAILED DESCRIPTION OF PREFERRED EMBODIMENTS

Figure 1A:
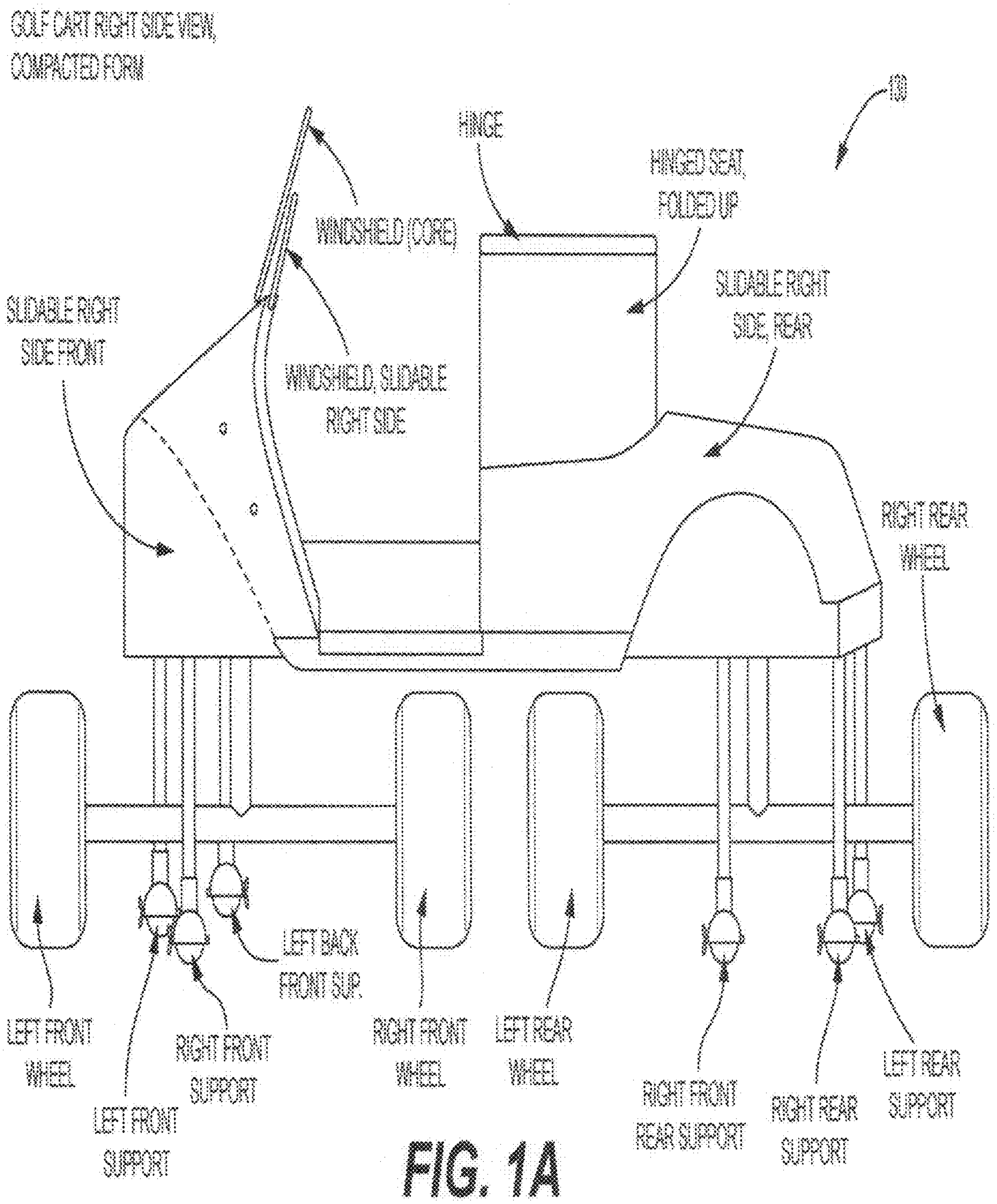
FIGS. 1A to 1B are diagrams of an example apparatus.

The following detailed description refers to the accompanying drawings. The same reference numbers in different drawings may identify the same or similar elements.

Systems, devices, and/or methods described herein may allow for expanding and contracting (i.e., compacting, reducing, etc.) an apparatus (e.g., a cart). In embodiments, the apparatus can be (1) retracted (i.e., contracted, compacted, reduced, etc.) in size when stored and (2) expanded in size when taken out of storage and used for its intended purpose. In embodiments, a compactible apparatus (e.g., a compactible cart), as described herein, can be used for recreation or for utility. By being compactible, a cart can be stored in areas with limited interior spaces (e.g., garages, storage sheds, etc.) thus ensuring that the cart can be protected from various weather conditions (e.g., rain, snow, hot or cold temperatures) and also ensure that the cart can be placed in a secured location. In embodiments, the diameter dimensions of the wheels and width dimension of the body of the cart may be similar in measurement be such that (a) when in the contracted state, the wheel's diameter dimension permits the contracted state to be stored effectively, and (b) permits the wheel's diameter dimension to be such that the wheel size can support the body of cart to hold additional weight (e.g., people) as well support movement of the cart when the cart is in the expanded state. Thus, as described herein, the wheel size allows the apparatus (e.g., apparatus 100, 130, etc.) described in various figures to move around (such as a golf cart), support the weight of the apparatus, and be able to store the apparatus when the apparatus is in the compacted state. In alternate embodiments, the diameter dimension of the wheels can be larger or smaller than the width dimension of the body of the cart (where individuals would sit within). In embodiments, an example compactible cart may be controlled by one or more computing devices to expand or contract the example compactible cart, and to facilitate mobility or positioning of the example compactible cart.

In embodiments, an example compactible apparatus (also known in the following specification as a cart, compactible apparatus, or as a cart) may have various features that permit for the expanding and contracting features. In embodiments, the various features may include (1) a core section of the compactible cart to which all other features may be attached, (2) multiple support legs with one or more support legs that can be retracted or extended to the extent required, (3) sides of the compactible cart that are expanded or retracted based on the desired size of the compactible cart, (4) one or more support actuators that may control one or more of the multiple support legs and the one or more sides of the compactible cart, (5) a rotatable front axle which includes the front wheels for the compactible cart, whereby the rotatable front axle is at one location when the compactible cart is contracted and at another location when the compactible cart is expanded, (6) a rotatable rear axle which includes the rear wheels for the compactible cart, whereby the rear axle is at one location when the compactible cart is contracted and another location when the compactible cart is expanded, and (7) a computing device that may control one or more of the other features of an example compactible cart.

Accordingly, when a user of an example compactible cart wishes to use the cart, the user may send a communication (e.g., switch, push button, wireless communication, etc.) to a computing device that may control the rotatable axles, the multiple support legs, the sides of the cart, and one or more actuators. Thus, the rotatable axle for the front wheels and the rotatable axle for the rear wheels move between the retractable support legs. In addition, when the axles are moving, either simultaneously or at a different time, the one or more side actuators expand the compactible cart's sides away from the cart's core section. As such, the compactible cart is (a) in an expanded state with the sides expanded away from the core section, and (b) with the rotatable front and rear axles are in a position to allow for movement of the compactible cart using the front and rear wheels (connected to their respective axles). Each of the front and rear rotatable axles are mounted on a vertically movable platform, with each rotatable axle connected to a rod that is connected to the vertically movable platform, allowing for the wheels to be raised above the ground surface when in the compacted phase and during transition between the contracted and expanded state, or the reverse transition, and in firm contact with the surface when in the expanded state, ready for use.

For an example compactible cart to be put back into a contracted state, the user may send another communication (e.g., via switch, push button, wireless communication, etc.) to the computing device that, again, controls the front and rear rotatable axles, the sides, the multiple support legs, and the one or more actuators. Based on the communication, the multiple support legs and support actuators extend and provide vertical lift to the core section and its associated component to a height at least sufficient to allow free rotation of the front and rear axles and free movement of the slidable sides. Thus, the front and rear rotatable axles move back to their original positions (associated with the cart in its contracted state), by moving between the multiple support legs. Additionally, one or more side actuators control the sides by retracting them back towards the core section and, thus, resulting in the compactible cart to be in a contracted state. In embodiments, the rotatable axles may move simultaneously or one after the other and may move in a clockwise or counter-clockwise direction, so long as those operations are timed to avoid conflict between the two axles as they are moving.

Thus, one or more apparatus, systems, and/or processes described for expanding a cart may include (a) support legs that extend downwards to lift the core frame along with all attached cart vehicle parts to a height allowing for rotation of axle/wheel assemblies from a point substantially aligned with the centerline (the centerline being from the front to the back of the cart) of the core frame ("core frame centerline"); (b) a front axle/wheel assembly (the axle/wheel assembly, is also referred to as a wheel system) and a rear axle/wheel assembly, each mounted on their respective vertically movable platform, and each rotating approximately 90 degrees from substantially aligned with the centerline of the core frame (in the compact state) to becoming perpendicular to the core frame centerline (in the expanded state); (c) slidable sides of the cart vehicle that slide away from the core frame, in a perpendicular direction to the core centerline, to a desired point aligned in whole or in part over each axle/wheel assembly also in the perpendicular direction to the core centerline; and (d) the support legs are retracted so that a portion of the cart vehicle weight onto the axle wheel assemblies. In embodiments, the approximately 90 degrees rotation of each axle/wheel assembly may occur in a clockwise or counter-clockwise direction and may occur together, simultaneously, or may occur at different times (e.g., the front axle/wheel assembly rotates approximately 90 degrees and then the rear axle/wheel rotates approximately 90 degrees at a later time).

In addition, one or more apparatus, systems, and/or processes described herein may also result in contracting a cart from an expanded state to a contracted state, and include (a) support legs which are extended so that the core frame and the axle/wheel assemblies, each associated with their respective vertically movable platform and swivel mechanism, that are moved upwards and off the ground, so as to permit movement of the rotating axle/wheel assemblies to/from those desired positions, (b) the slidable sides of the cart vehicle slide toward the centerline of the core frame, to a desired point over the core frame, and (c) the axle/wheel assemblies are rotated approximately 90 degrees to be substantially aligned with the core framework centerline. In embodiments, the approximately 90 degrees rotation of each axle/wheel assembly may occur in a clockwise or counter-clockwise direction and may occur together, simultaneously, or may occur at different times (e.g., the front axle/wheel assembly rotates approximately 90 degrees and then the rear axle/wheel rotates approximately 90 degrees at a later time).

In embodiments, other features of an example cart may be used when the cart is in an expanded state. In embodiments, these features may include tie-rods that may be used for steering, power transfer between a motor powering the cart for transportation and front and/or rear axles, shock absorbers coupled with one or both axle/wheel assemblies, etc. In embodiments, such features can be mechanically or manually foldable during a cart's contracted state or used for steering features associated with a cart's expanded state.

Figure 1B:
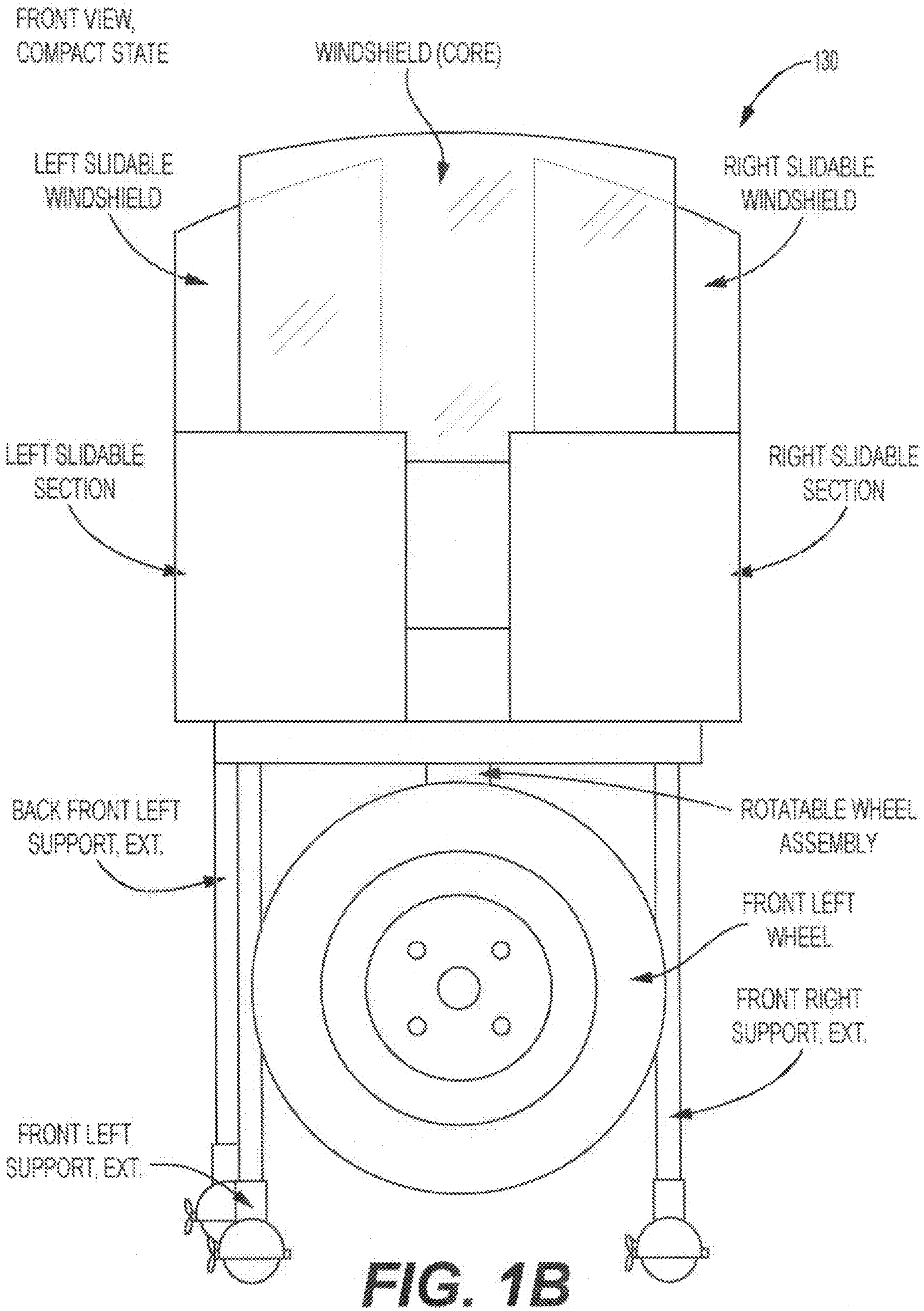

FIGS. 1A to 1B are example diagrams of apparatus 130. As shown, apparatus 130 is a golf cart that is in a compact state. FIG. 1A shows apparatus 130 from a side perspective view while FIG. 1B shows apparatus 130 from a front perspective view. As shown in apparatus 130, particularly in FIG. 1B, the example golf cart is designed such that the entire apparatus is in a compact state with the diameter of the wheels, the width of the body of the golf cart, and the support legs are compacted such that the golf cart can be placed in a particular area/space (e.g., an area of the garage, storage shed, etc.). FIG. 1A shows a side view of apparatus 130 with the front wheels (right and left) and the rear wheels (right and left) in a compact state. As shown in FIG. 1A, the body of the golf cart (where people and items would be stored when in an expanded state) is attached to the wheel/axles system. Furthermore, FIG. 1A shows the wheel assembly attached to the bottom of the body of the cab/seating area of the golf cart. FIG. 1B shows a front view of apparatus 130 with the front left wheel visible and the front perspective of the body of the golf cart.

As shown in FIGS. 1A and 1B, one of the benefits of the apparatus, systems, and/or processes described herein is to fit an apparatus with the wheel system, support legs, and body. Thus, the diameter of the wheel (as shown in FIG. 1B) is slightly smaller than the width of the body of the golf cart such that sufficient wheel system (including the axle) sizes can be used to support the movement of the golf cart. As will be further described in other figures, the wheel system may rotate such that the wheel system is perpendicular to the golf cart's cab (similar to that described in FIG. 1D) to permit movement of the golf cart; and, the sides of the golf cart cab expand to permit individuals to sit down inside the golf cart cab.

The features in FIGS. 1A and 1B may be similar to those features described in other figures. For example, the golf cart cab (with its windshield features, seats, etc.) may be attached to the top of a surface area such as core 102. For example, the slidable right front and rear sides may be operate like side 109 (made up of slides 104A and 104B which may be connected to each other via hinges) and side 111 (made up of slides 104Ai and 104Bi which may be connected to each other via hinges) as described in FIGS. 1C-1D. Furthermore, the front wheels (right and left) and the rear wheels (right and left) may operate in a manner similar to wheel system 106 (for the front) and wheel system 106*i* (for the rear), respectively, as described in FIGS. 1C-1D. And, the left front support, right front support, left back support, right front rear support, right rear support, and left rear support may operate in a manner similar to legs 108*u* (shown at front right), legs 108*v* and 108*w* (shown at front left), leg 108*x* (shown at rear left), legs 108*y* and 108*z* (shown at rear right), respectively, as described in FIGS. 1C-1D.

FIGS. 1C-1K are example diagrams of apparatus 100. In embodiments, apparatus 100 may be a cart (e.g., a compactible cart). In embodiments, the process of expanding and contracting apparatus 130 (as described in FIGS. 1A and 1B) may be described by the processes described in regards to FIGS. 1C-1K. In embodiments, apparatus 100 may include core 102, side 109 (made up of slides 104A and 104B which may be connected to each other via hinges), side 111 (made up of slides 104Ai and 104Bi which may be connected to each other via hinges), wheel system 106 (for the front) and wheel system 106*i* (for the rear), legs 108*u* (shown at front right), legs 108*v* and 108*w* (shown at front left), leg 108*x* (shown at rear left), legs 108*y* and 108*z* (shown at rear right), support actuators 110*u* (for use with leg 108*u*), support actuators 110*v* and 110*w* (for use with legs 108*v* and 108*w*), support actuator 110*x* (for use with leg 108*x*), support actuators 110*y* and 110*z* (for use with legs 108*y* and 108*z*), sides 115, and computing device 112.

Figure 1C:
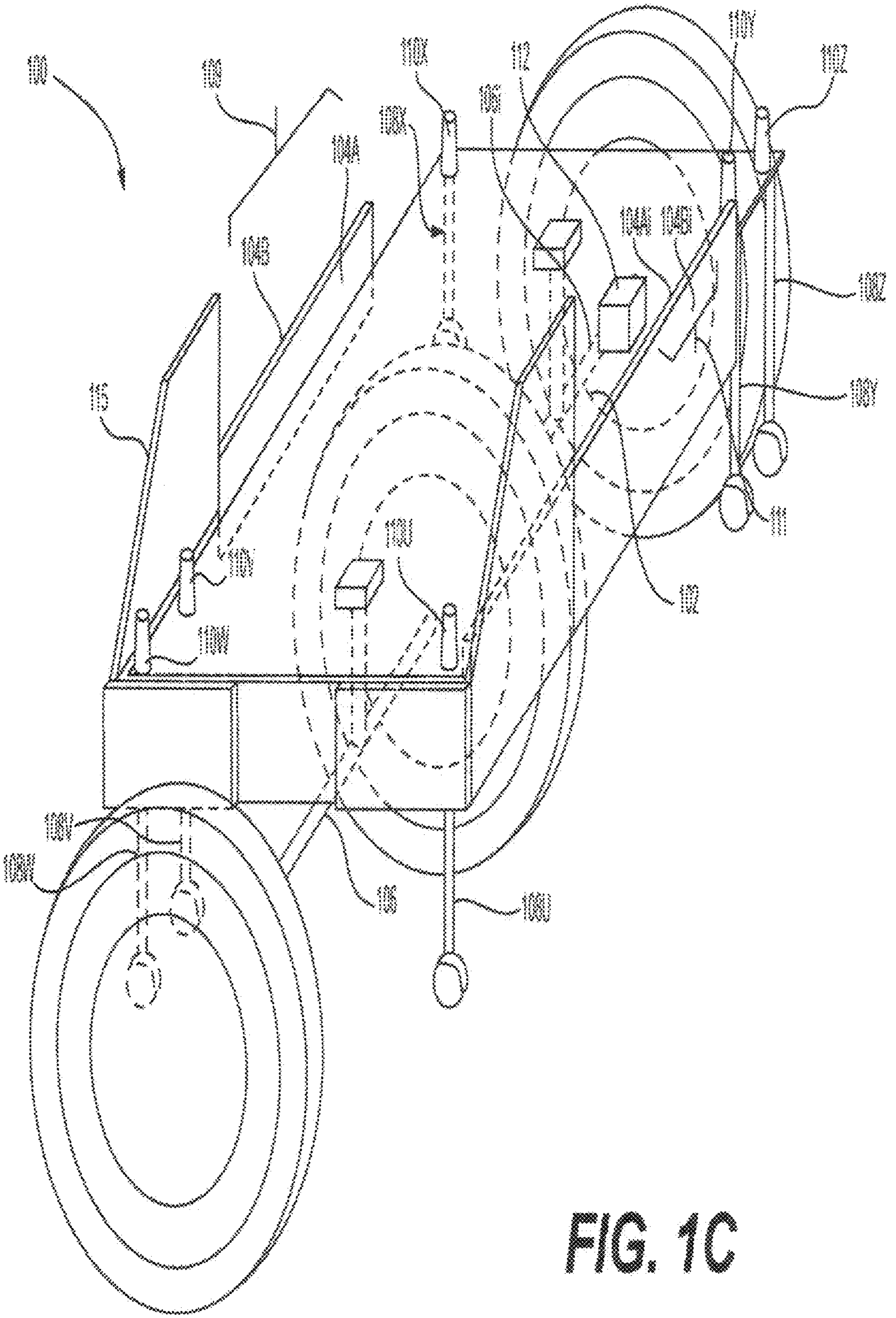
FIGS. 1C to 1K are diagrams of another example apparatus.
Figure 1D:
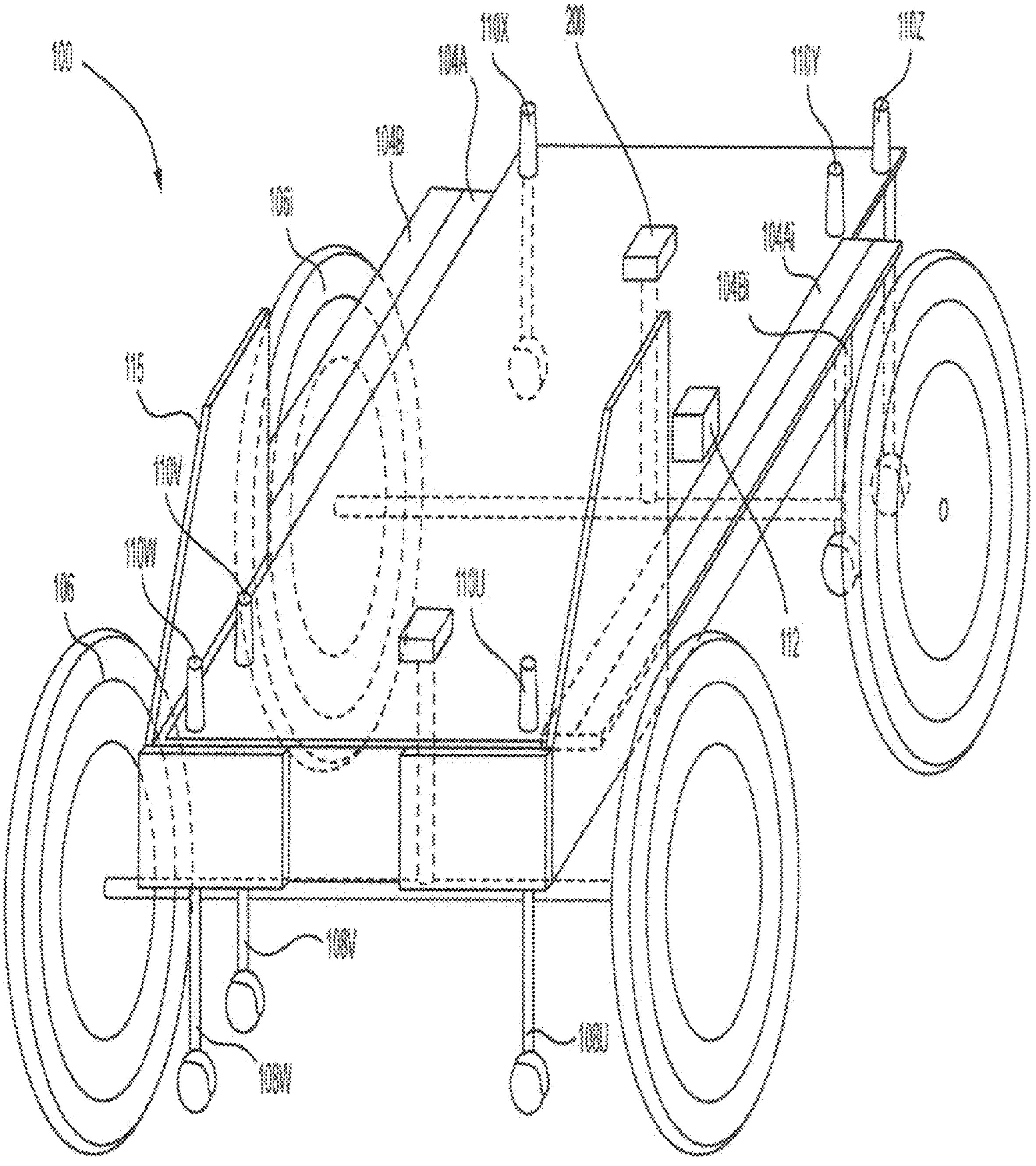
Figure 1E:
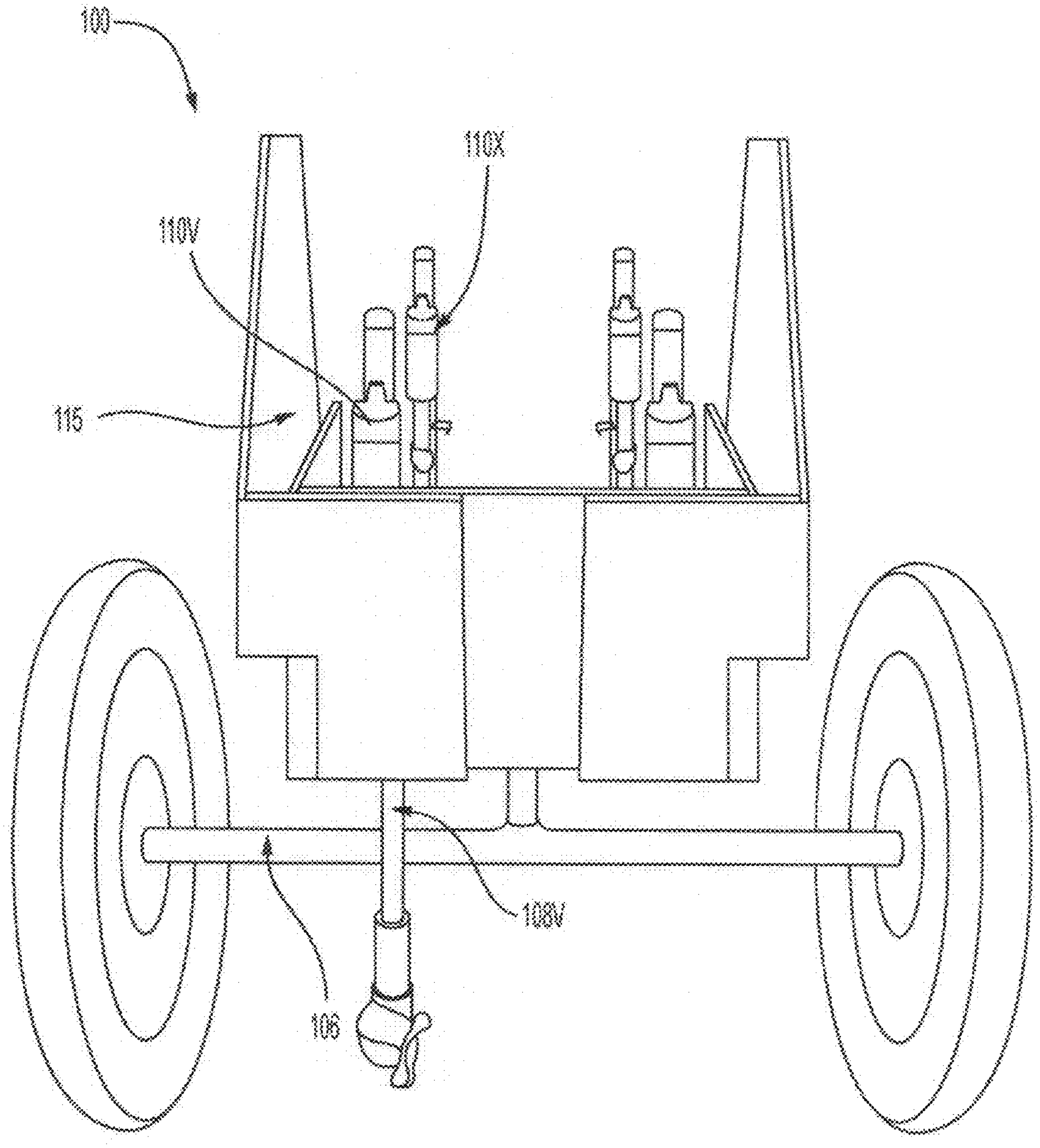
Figure 1F:
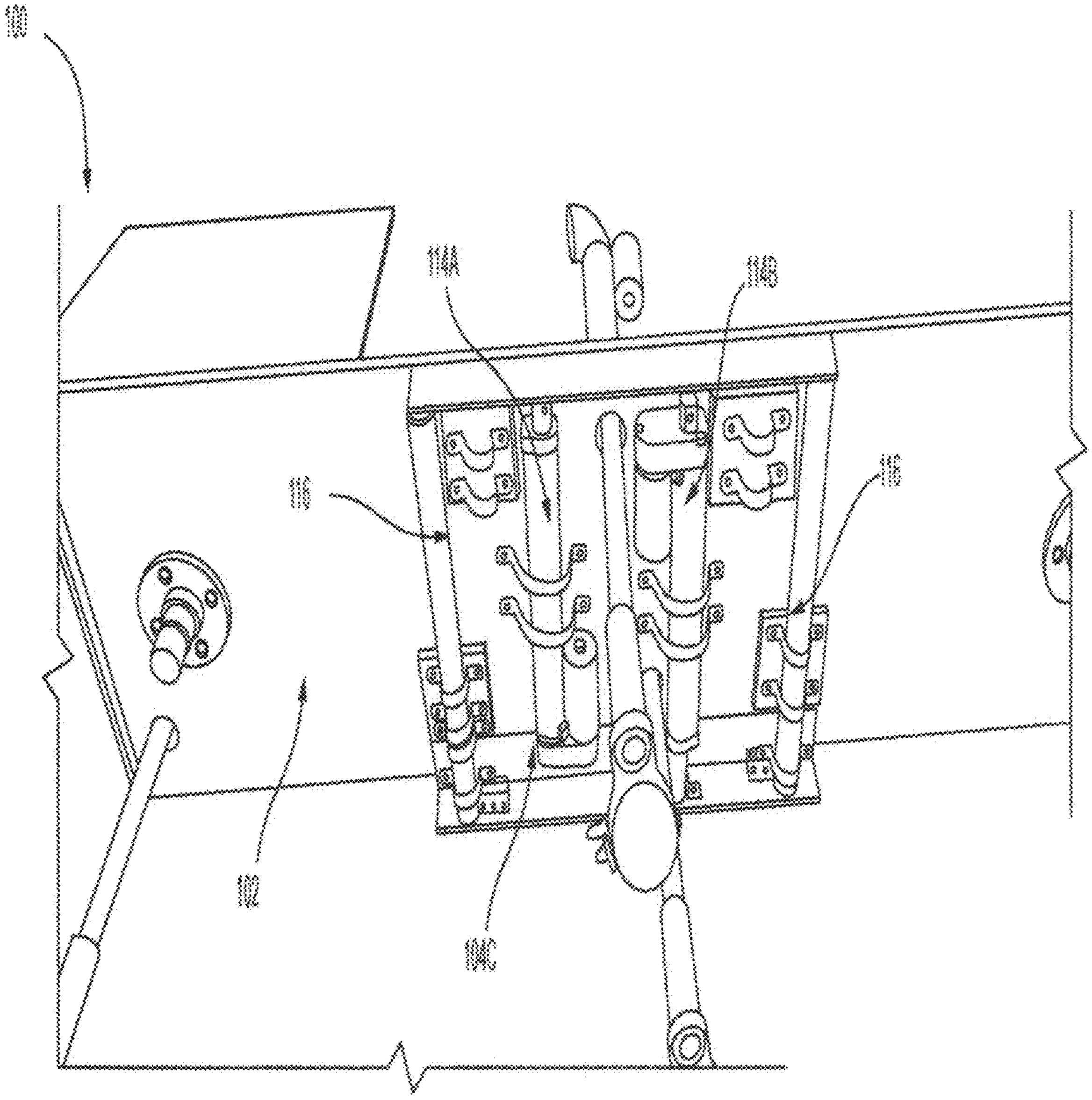
Figure 1G:
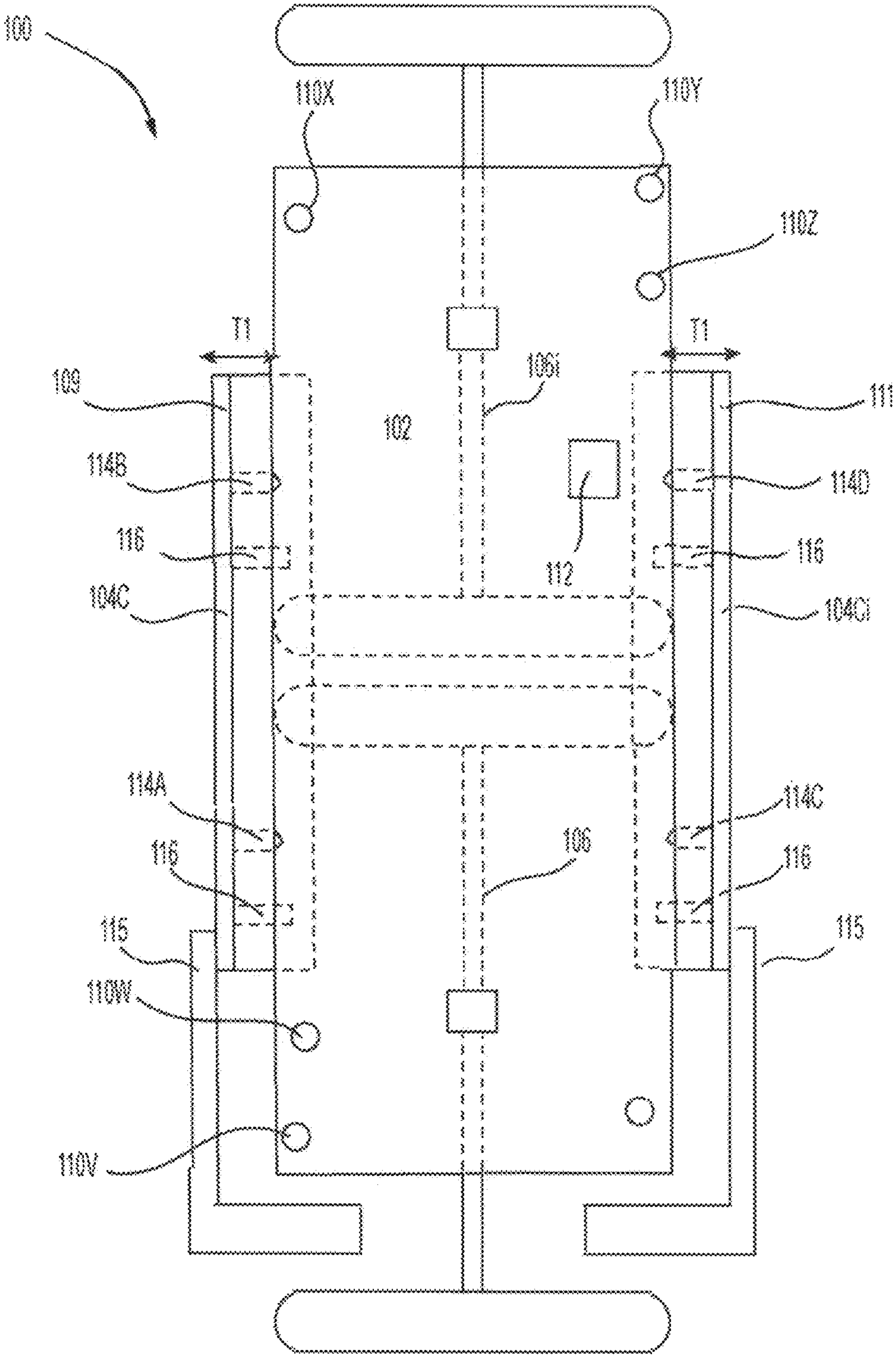
Figure 1H:
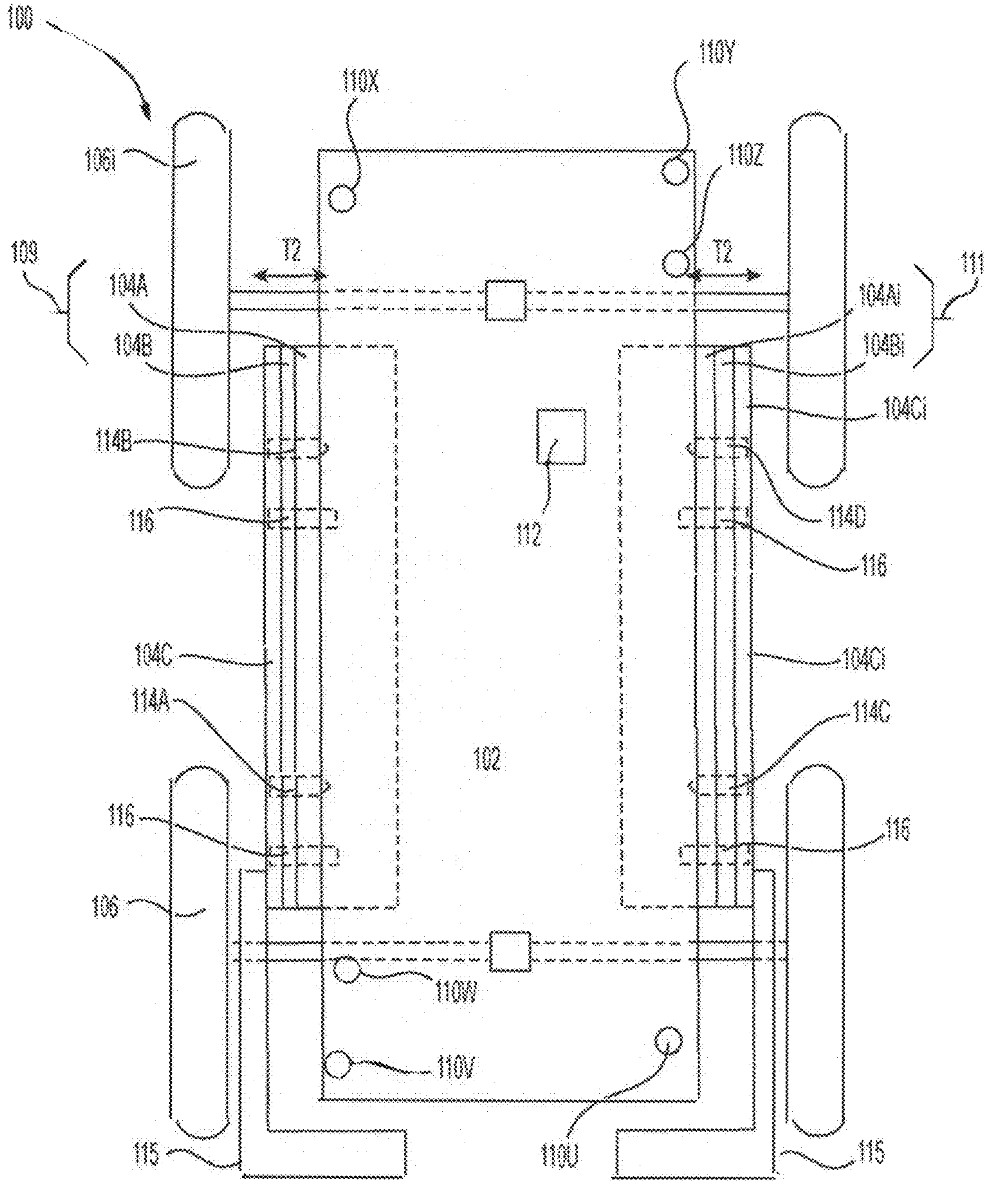
Figure 1I:
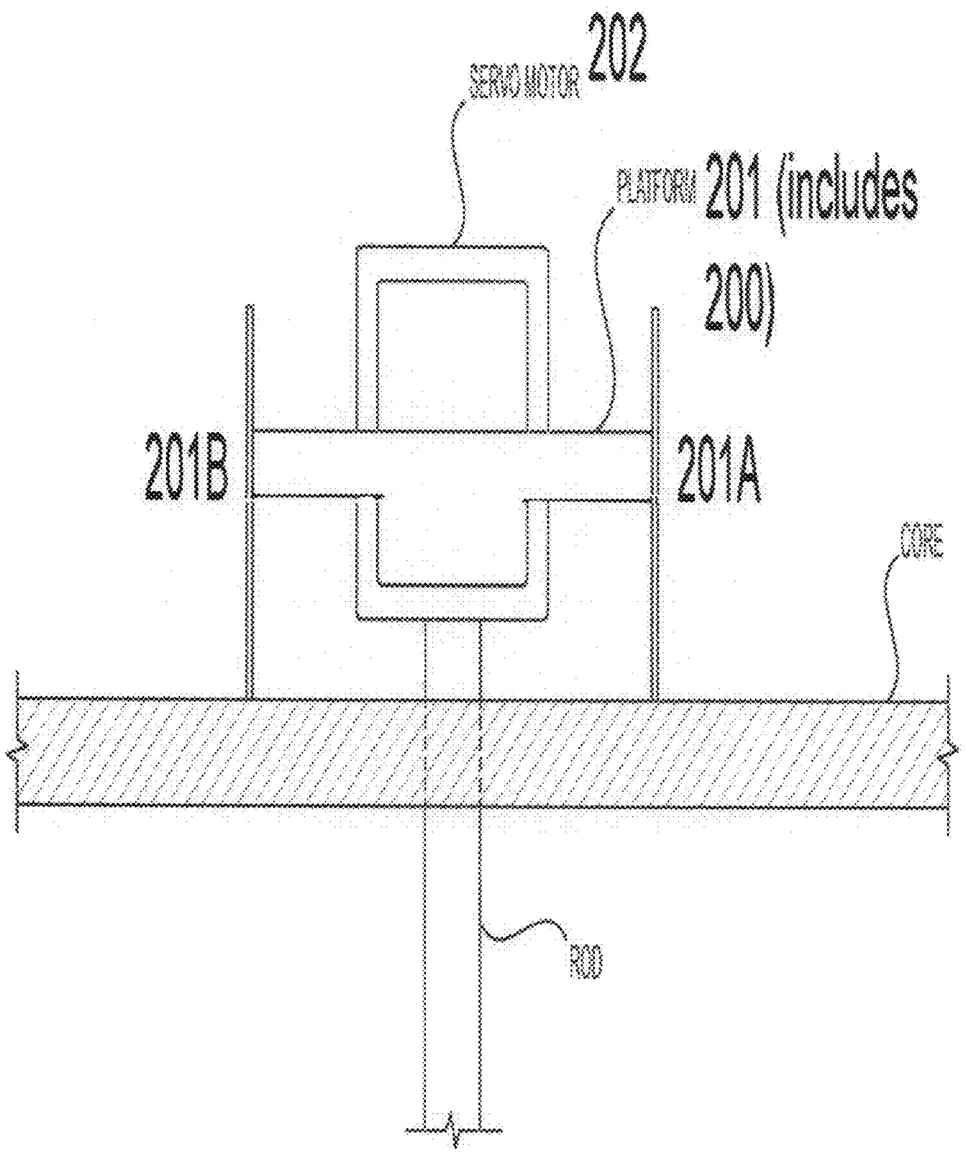

As defined for this example and other example figures, wheel system 106 is an axle/wheel assembly that include an axle, wheels at each of the axle, and a rod perpendicular to the axle that is connected to swivel device 200 that is incorporated into a vertically movable platform 201 and can be controlled and rotated by a servo-motor 202 connected at wheel system 106 which is also shown in FIG. 1I in a blown-up view. Platform 201, which is vertically adjustable, allows the swivel device 200 and associated axle/wheel assembly 106 to rise when the support legs extend to lift the core section during transition and when in the contracted state, so that the axle/wheel assembly may freely rotate without contacting the ground surface. Likewise, platform 201, which is vertically adjustable, allows swivel device 200 and associated axle/wheel assembly 106 to be lowered when the support legs are retracted so that the axle is in contact with support struts or shock absorbers and the wheels are resting on and supported by the ground surface. This allows servo-motor 202 (based on communications to servo-motor 202) to control rotation of the axle portion of wheel system 106 during contraction or expansion of apparatus 100, free from obstruction by the ground surface. Thus wheel system 106 is used in the following examples instead of axle/wheel assembly.

As defined, wheel system 106*i* is an axle/wheel assembly that includes an axle, wheels at each of the axle, and a rod perpendicular to the axle that is connected to a swivel mechanism 200 that is incorporated into a vertically movable platform 201 and can be controlled by a servo-motor connected through a rod to wheel system 106*i*; and, thus allowing the servo-motor (based on communications to the servo-motor) to control rotation of the axle portion of wheel system 106*i* during contraction or expansion of apparatus 100. Thus, wheel system 106*i* is used in the following examples instead of the term axle/wheel assembly.

In embodiments, core 102 may be constructed of metal, plastic, or a composition of materials that can support additional features such as weight loads (e.g., people, boxes, etc.), seating, and/or other items. In embodiments, side 109 is made up of slides 104A and 104B (on left side of apparatus 100). In embodiments, slides 104A and 104B are both pieces of material (similar or not similar to the material used to construct core 102) that have flat surfaces which are perpendicular to the top surface of core 102 when apparatus 100 is in the contracted state, and the same flat surfaces being parallel (flush or near flush) with the top surface of core 102 when apparatus 100 is in the expanded state. In embodiments, side 111 is made up of slides 104Ai and 104Bi (on the right side). In embodiments, slides 104Ai and 104Bi are both pieces of material (similar or not similar to the material used to construct core 102) that have flat surfaces which are perpendicular to the top surface of core 102 when apparatus 100 is in the contracted state, and the same flat surfaces being parallel (flush or near flush) with the top surface of core 102 when apparatus 100 is in the expanded state.

In embodiments, slide 104A is connected to the left side of core 102 and slide 104Ai is connected to the right side of core 102. In embodiments, slide 104A is connected to slide 104B via a hinge at the top surface of each side (as further described in FIGS. 5A to 5I). In embodiments, slide 10B is attached to bracket 104C by a hinge. In embodiments, 104Ai (on the right side) may be connected to slide 104Bi (on the right side) via a hinge, or another type of connecting mechanism, at the top surface of each side in a similar fashion to how slides 104A and 104B are connected to each other. Similarly, slide 104Bi is attached to bracket 104Ci. As shown in FIGS. 1A and 1B, slides 104A and 104B make up side 109, and slides 104Ai and 104Bi make up side 111.

In embodiments, sides 109 and 111 are expanded in a direction perpendicular to the core centerline through operation of side actuators 114A, 114B, 114C, and 114D. As such, in the expanded state, the slidable slides 104A and 104B create an addition surface, flush or nearly flush, with the top surface of core 102 and, either before, after, or at the same time, axles 106 and 106*i* have been rotated into position perpendicular to the core centerline.

In embodiments, when apparatus 100 is expanded, sides 104B and 104Bi may slide away from core 102, causing 104A and 104Ai to unfold (as they move away from core 102) and form an expanded floor surface when apparatus 100 is expanded. As further described herein, slides 104A and 104Ai may be connected to core 102 via connecting hinged surfaces that move perpendicular to core's 102 centerline based on operation of multiple side actuators, such as side actuator 114A (front left), 114B (rear left), 114C (front right) and 114D (rear right) as shown in FIGS. 1D, 1E, and 1F. For example, FIG. 1F shows a portion of bottom of apparatus 100 for the left side and shows side actuators 114A and 114B which are attached to bracket 104C. In embodiments, when apparatus 100 is expanding, side actuators 114A and 114B receive commands (electronic, pneumatic, mechanical, and/or a wireless) to push bracket 104C away from core 102. Thus, when side actuators 114A and 114B push bracket 104C away from core 102, slides 104A and 104B, and slides 104Ai and 104Bi, slide away and create a flat surface that is flush, or near flush, with the top surface of core 102. In addition, FIG. 1F shows supporters 116 which are provided to maintain support for when sides 104A and 104B expand away from core 102.

In embodiments, wheel system 106 is connected to the bottom surface (facing the ground) of core 102. In embodiments, wheel system 106 is connected to core 102 by a swivel-type device 200 (e.g., that can rotate from its position in a compact state to a position perpendicular to the core centerline in preparation for regular operation, incorporated into a vertically movable platform 201, with rotation accomplished using a servo-motor 202 attached platform 201 and through a rod, to the wheel system 106. In embodiments, the servo-motor 202 is connected to swivel type device 200 that is connected to a rod that connects to the axle feature of wheel system 106 and wheels connected to each end of the axle feature of wheel system 106.

In embodiments, the servo motor, when receiving an electronic command (e.g., via a switch, computer generated communication, push button, etc.) may result in rotational, horizontal movement of wheel system 106 from its position in the compact state to a position perpendicular to the core centerline. In embodiments, when apparatus 100 is in a compact state (and not in use as a conveyance), through the vertical movement permitted by vertically movable platform 201, wheel system 106 is suspended above the ground or floor and is positioned to be substantially in parallel to the centerline of core 102 so as to keep apparatus 100 to a minimal width. In embodiments, when apparatus 100 is in an expanded state and is in use, wheel system 106 is positioned to be perpendicular to the centerline of core 102 so as to allow the wheels of wheel system 106 to cause or enable the movement of apparatus 100 (as support legs 108*u*-108*z* have been moved off the ground by support actuators 110*u*-110*z*).

In embodiments, wheel system 106*i* is connected to the bottom surface (facing the ground) of core 102. In embodiments, wheel system 106*i* is connected to core 102 by a swivel-type device 200 (e.g., that can rotate from its position in a compact state to a position perpendicular to the core centerline in preparation for regular operation), incorporated into a vertically movable platform 201, with rotation accomplished using a servo motor attached to wheel system 106*i*.

In embodiments, the servo motor (which is considered part of wheel system 106*i*) is connected to a swivel-type device 200 that is connected to a rod that connects to the axle feature of wheel system 106*i* and whereby wheels are connected to each end of the axle feature of wheel system 106*i*.

In embodiments, the servo motor, when receiving an electronic command (e.g., via a switch, computer generated signal, push button, etc.) may result in rotational, horizontal movement of wheel system 106*i*'s from its position in the compact state to a position perpendicular to the core centerline. In embodiments, when apparatus 100 is in a compact state (and not in use as a conveyance), wheel system 106*i* is suspended above the ground or floor and is positioned to be substantially in parallel to the centerline of core 102 so as to keep apparatus 100 to a minimal width. In embodiments, when apparatus 100 is in an expanded state and is in use, wheel system 106*i* is positioned to be perpendicular to the centerline of core 102 so as to allow the wheels of front wheel system 106 to cause or enable the movement of apparatus 100 (as support legs 108*u*-108*z* have been moved off the ground by support actuators 110*u*-110*z*).

In embodiments, wheel system 106 and wheel system 106*i* may be in contact with the ground when the apparatus 100 is in the expanded state, but not operating as a conveyance, and in preparation to transition from an expanded state to a compact state. To change apparatus 100 from an expanded state to a compact state, axles 106 and 106*i* may be raised off the ground by using support actuators 110*u*-110*z* to cause support legs 108*u*-108*z* to extend downwards and lifting core 102, and all attached features (includes axles 106 and 106*i*) to core 102, to raise off of the ground surface to a height sufficient to allow the wheel system 106 and 106*i* to rotate without contact with the ground.

In embodiments, each swivel-type device 200 that enables rotation of wheel system 106 and wheel system 106*i* is connected to the core 102 as part of each vertically movable platform and allows (a) movement/rotation of wheel system 106 and 106*i* when they are touching the ground (such as apparatus 100 in the expanded state) and (b) movement/rotation of axles 106 and 106*i* when they are not touching the ground (such as in apparatus 100 in the compact state). In embodiments, one or both of axles 106 and 106*i* may be connected to a steering wheel or other device (such as a joystick) to permit turning apparatus 100 in different directions when apparatus 100 is in the expanded state.

In embodiments, for changing apparatus 100 from a contracted state to an expanded state, wheel system 106 and wheel system 106*i*, both attached to core 102, may be moved off the ground/floor by move legs 108*u*-108*z* (by using support actuators 110*u*-110*z*) to a height sufficient to permit rotation of axles 106 and 106*i* which are not touching the ground and free from ground friction/interference.

Accordingly, in embodiments, as to wheel system 106, support actuators 108*v* and 108*w* operate in a prescribed sequence to enable rotation of wheel system 106 from (a) its position when the apparatus is in the compact state to (b) a position perpendicular to the core centerline, the position enabling operation of the apparatus as a conveyance. More specifically, as wheel system 106 rotates toward support actuator 110*v* and support leg 108*v*, support actuator 110*v* retracts causing support leg 108*v* to raise to a height sufficient to allow wheel system 106 to continue to rotate past support leg 108*v* and toward support leg 108*w*. Once wheel system 106 is past the position of support leg 108*v*, support actuator 110*v* extends to cause support leg 108*v* to lower to the ground/floor surface and support actuator 110*w* then retracts causing support leg 108*w* to raise to a height sufficient to allow wheel system 106 to continue its rotation to a position perpendicular to the core centerline. Once wheel system 106 is past support leg 110*w*, support actuator 108*w* extends to cause support leg 110*w* to lower to the ground/floor. In embodiments, the movement of wheel system 106 does not pass across leg 108*u*. Thus, leg 108*u* never moves up or down during the movement of wheel system 106.

In embodiments, as to wheel system 106*i*, support actuators 108*y* and 108*z* operate in a prescribed sequence to enable rotation of wheel system 106*i* from its position when the apparatus is in the compact state to a position perpendicular to the core centerline, the position enabling operation of the apparatus as a conveyance. More specifically, axle/wheel assembly 106*i* rotates toward support actuator 110*y* and support leg 108*y*, support actuator 110*y* retracts causing support leg 108*y* to raise to a height sufficient to allow axle/wheel assembly 106*i* to continue to rotate past support leg 108*y* and toward support leg 108*z*. Once wheel system 106*i* is past the position of support leg 108*y*, support actuator 110*y* extends to cause support leg 108*y* to lower to the ground/floor surface and support actuator 110*z* then retracts causing support leg 108*z* to raise to a height sufficient to allow wheel system 106*i* to continue its rotation to a position perpendicular to the core centerline. Once wheel system 106*i* is past support leg 110*z*, support actuator 108*z* extends to cause support leg 110*z* to lower to the ground/floor. In embodiments, the movement of wheel system 106*i* does not pass across leg 108*x*. Thus, leg 108*x* never moves up or down during the movement of wheel system 106*i*. Thus, apparatus 100 has changed from a compact state (in FIG. 1C) to an expanded state (in FIG. 1B).

Once rotation is completed (either from a contracted state to an expanded state, or vice-versa), axle/wheel assemblies 106 and 106*i* can be moved downwards (to the ground) based on the retraction (simultaneously or in a particular sequence) of support legs 108*u*-108*z* from off the ground, thus allowing the transfer of the load of the core 102 from support legs 108*u*-108*z* to axles 106 and 106*i*. Thus, as shown in FIG. 1B, with apparatus 100 is now in an expanded state, axles 106 and 106*i* are perpendicular to the center line of core 102.

In embodiments, each of legs 108*u*, 108*v*, 108*w*, 108*x*, 108*y*, and/or 108*z* may be terminated with a mechanism (such as a swivel wheel) to reduce friction with the ground (e.g., a floor surface) upon lateral movement of apparatus 100 so as to allow apparatus 100, when support legs 108 are bearing the load of the apparatus (typically in the contracted state), to move in a plurality of lateral directions. Thus, legs 108*u*, 108*v*, 108*w*, 108*x*, 108*y*, and/or 108*z* allow apparatus 100 to be moved to a desired location for the transition to the expanded state or for storage. Alternatively, one or more of support actuators 110*u*, 110*v*, 110*w*, 110*x*, 110*y* and/or 110*z* may serve as a support leg 108*u*, 108*v*, 108*w*, 108*x*, 108*y*, and/or 108*z* for apparatus 100 instead of a support actuator attached to each support leg.

In embodiments, an optional movement restriction mechanism, such as a wheel lock, may be incorporated into one or more legs 108*u*, 108*v*, 108*w*, 108*x*, 108*y*, and/or 110*z* to secure apparatus 100 once it has been moved to a desired location, so as to restrict further movement of apparatus 100 in the contracted state.

In alternate embodiments, at least two of legs 108*u*, 108*v*, 108*w*, 108*x*, 108*y*, and 108*z* may include powered wheels that are capable of swiveling to desired positions and rotating bi-directionally, upon receiving appropriate signals from a computing device, so as enable horizontal movement of the apparatus in a low friction manner in a desired direction when touching the ground.

In embodiments, support actuators 110*u*, 110*v*, 110*w*, 110*x*, 110*y*, and 110*z* may be a type of actuator that can receive a signal (e.g., electronic, pneumatic, hydraulic, etc.) that results in movement of such actuator. In embodiments, support actuators 110*u-z* may extend and retract one or more legs 108*u-z* in an up and down direction (perpendicular to core 102) that assist in moving apparatus 100 from a contracted to expanded state (or vice versa).

As described in further diagrams, one or more described features of apparatus 100 in the compact state may be controlled to move apparatus 100 from a compacted state to an expanded state (or vice versa). In embodiments, as shown in FIG. 1C, apparatus 100 is in a contracted state since axle/wheel assemblies 106 and 106*i* are substantially parallel with a centerline of core 102. In FIG. 1B, apparatus 100 is in an expanded state since axle/wheel assemblies 106 and 106*i* are perpendicular with the centerline of core 102. In embodiments, apparatus 100 expands from the contracted state shown in FIG. 1C to the expanded state shown in FIG. 1B based on the processes described in other figures. Further, FIG. 1E, apparatus 100 is also shown in the expanded state but from a front perspective view.

FIG. 1F shows the bottom surface (as viewed from the ground) of apparatus 100 with only a portion of the left side of apparatus 100 being visible. In embodiments, side actuators 114A and 114B may be a type of actuator that can receive a command (e.g., electronic, pneumatic, hydraulic, etc.) that results in movement of such actuator. In embodiments, side actuators 114A and 114B may extend and retract in a direction that is other than parallel to the centerline of core 102, and, thus, resulting in the movement of bracket 104C. In embodiments, foldable section component 104B of side 109 (not visible in FIG. 1F) is connected to bracket 104C. In embodiments, when apparatus 100 is being changed to a compact to expanded state, side actuators 114A and 114B push bracket 104C away from core 102. In doing so, foldable sections component 104A and 104B, that make up side 109, begin to slide from (i) a perpendicular position to the surface of core 102 to (ii) a parallel position with the top surface of core 102. In embodiments, foldable sections 104A and 104B are connected to each with hinges, slide 104A is connected to core 102 via a hinge, and slide 104B is connected to the top surface of bracket 104C via a hinge.

Also shown in FIG. 1F, two horizontally connectors 116, comprised of rigid material such as metal or high tensile strength plastic, are positioned underneath side 104A to provide structure support under said connecting member and to provide a more rigid connection between the core frame and the slidable sides when in the expanded state. In embodiment, connectors 116 have one end attached to bracket 104C while the other end is placed in a holder (which is affixed to core 102). Thus, when bracket 104C moves away from core 102, each connector 116 slide through the holder as it is being moved away due to its connection to bracket 104C. Accordingly, connectors 116 moves in a direction perpendicular to core 102's centerline as the cart transitions between the expanded and compact state while preventing connectors 116 from any significant downward travel despite load that would otherwise cause such movement.

FIG. 1G is a diagram of apparatus 100 (shown in FIG. 1C) in a contracted state from a top perspective view (as is one is looking at apparatus 100 from the ground). In FIG. 1G, core 102 may be constructed of a translucent material so as to show all features connected to the top and bottom of core 102. In alternate embodiments, core 102 may be constructed of any other durable material and does not require to be translucent. The locations of wheel system 106, wheel system 106*i*, support actuators 110*u*, 110*w*, 110*x*, 110*y*, and 110*z* are shown in FIG. 1G. Legs 108*u*, 108*w*, 108*x*, 108*y*, and 108*z* are not visible as they are located directly below each of support actuator 110*u*, 110*w*, 110*x*, 110*y*, and 110*z*, respectively. FIG. 1G also shows a top perspective view of swivel device 200 and platform 201 (as described in FIG. 1I).

Also, computing device 112 is also shown in FIG. 1G, but can be located anywhere on core 102. Sides 109 and 111 are in a contracted state and thus, their surfaces (the surfaces of 104A, 104B, 104Ai, and 104Bi) are not visible as they are in a contracted state. The outer edge of bracket 104C and the outer edge of bracket 104Ci are at a distance T1 from the left and right edges of core 102, respectively. Slides 115 are shown and are connected (e.g., using nails, screws, soldering, hinge, etc.) to bracket 104C. In embodiments, sides 109 and 111, and brackets 104C and 104Ci, may have a length that is equal to the lengths of the sides of core 102. In alternate embodiments, sides 109 and 111, and brackets 104C and 104Ci, may have a length that is a different from the lengths of the side of core 102.

FIG. 1H is a diagram of apparatus 100 (shown in FIG. 1B) in an expanded state from a top perspective view. In FIG. 1H, core 102 may be constructed of a translucent material so as to show all features connected to the top and bottom of core 102. In alternate embodiments, core 102 may be constructed of any other durable material and does not require to be translucent. The locations of wheel system 106, wheel system 106*i*, support actuators 110*u*, 108*v*, 110*w*, 110*x*, 110*y*, and 110*z* are shown in FIG. 1H. Legs 108*u*, 108*v*, 108*w*, 108*x*, 108*y*, and 108*z* are not visible as they are located directly below each of support actuator 110*u*, 110*v*, 110*w*, 110*x*, 110*y*, and 110*z*, respectively. Also, computing device 112 is also shown in FIG. 1H, but can be located anywhere on core 102. Sides 109 and 111 are in an expanded state and, thus, their surfaces (the surfaces of slides 104A, 104B, 104Ai, and 104Bi) are visible as each slide has been expanded out in a manner similar to that shown in FIGS. 5A to 5I. Since they are visible, bracket 104C has been pushed out. Accordingly, the outer edge of bracket 104C and the outer edge of bracket 104Ci are at a distance of T2 from the left and right edges of core 102, respectively. Also, sides 115 have been pushed out from core 102 based on the movement of bracket 104C. FIG. 1G also shows a top perspective view of swivel device 200 and platform 201.

FIG. 1I is an example view of a platform 201. As shown in FIG. 1I, platform 201 includes rails 201A and 201B. In embodiments, platform 201 may have additional rails. As shown in FIG. 1I, rails 201A and 201B may connect platform 201 with a core (e.g., core 102) such that platform 201 allows movement of the rod of wheel system 106 to be moved up when the core moves up (based on expanding support legs, such as support legs 108*u*, 108*x*, etc.) since core pushes up against the bottom of platform 201 and which then moves axles 106 up and off the ground. Alternatively, in the expanded state, when the core moved down (based on contracting support legs), this results in wheel system 106 to move downward so that the wheels of wheel system 106 are touching the ground. Also, as shown in FIG. 1I, there is servo-motor 202 and swivel device 200. In embodiments, servo-motor 202 (based on communications from computing device 112) controls swivel device 200 which allows for wheel system 106 to be rotated when being moved from an expanded to contracted state or vice versa. Platform 201, rails 201A and 201B, platform 201, and swivel device 200 may be shown in other figures.

Figure 1J:
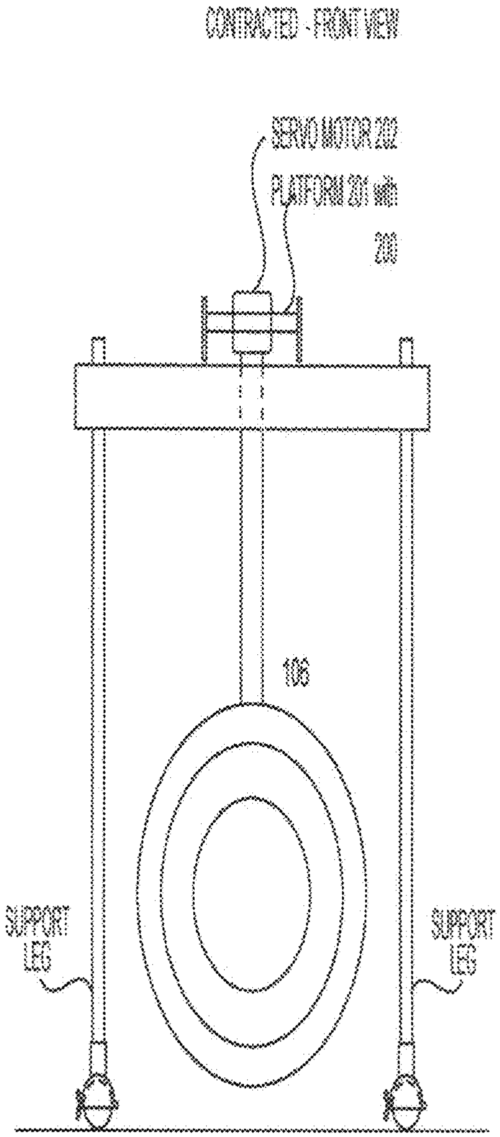

FIG. 1J is an example front view of a portion of apparatus 100 in the contracted state. As shown in FIG. 1J, swivel device 200 is shown that is incorporated into platform 201, which is vertically adjustable. In embodiments, swivel device 200 can be controlled and rotated by a servo-motor 202 which is connected to wheel system 106. As shown in FIG. 1J, this portion of apparatus 100 is in a contracted state (similar to apparatus 100 shown in FIG. 1C). In embodiments, platform 201, which is vertically adjustable, allows the swivel device 200 and wheel system 106 to rise when the support legs extend to lift core 102 during transition. As shown in FIG. 1J, when the support legs (which are similar to support legs 110*u*, 100*w*, etc.) are extended, this causes core 102 to push up against the bottom surface of platform 201 and allows for wheel system 106 to also rise up so that the wheels of axles 106 are moved off the ground.

Figure 1K:
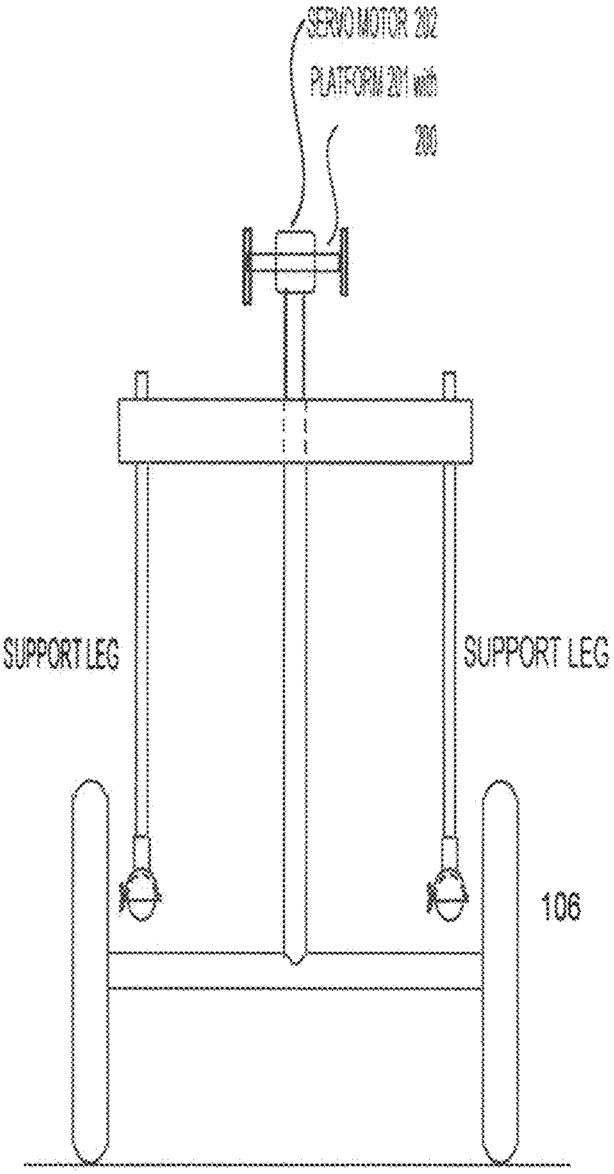

FIG. 1K is an example front view of a portion of apparatus 100 in the expanded state. As shown in FIG. 1K, swivel device 200 is shown that is incorporated into platform 201, which is vertically adjustable. In embodiments, swivel device 200 can be controlled and rotated by a servo-motor 202 which is connected to wheel system 106. As shown in FIG. 1K, this portion of apparatus 100 is in an expanded state (similar to apparatus 100 shown in FIG. 1B). In embodiments, platform 201, which is vertically adjustable, allows the swivel device 200 and wheel system 106 to rise when the support legs extend to lift core 102 during transition. As shown in FIG. 1K, when the support legs (which are similar to support legs 110*u*, 100*w*, etc.) are contracted (so that the support legs are off the ground), this causes core 102 to push down and away from the bottom surface of platform 201 and allows for wheel system 106 to move down so that the wheels of axles 106 are on the ground. While FIGS. 1I, 1J, and 1K show servo-motor 202 located at the top of platform 201, in other embodiments, there may be no servo-motor 202 located at the top of platform 201 and servo-motor 202 may be located at another location on the devices described (e.g., another location on a platform).

In other alternate embodiments, each rod of wheel system 106 may include a motorized unit that connects to platform 201 (where swivel device 200 is incorporated into platform 201). In embodiments, swivel device 200 may be mounted on shock absorbing media that can absorb minor compression. Accordingly, the overall length of the rod can be extended away or towards the swivel device as required. In embodiments, each rod (for each wheel system 106) may include a set of cylinders of decreasing diameters. Thus, the outer facing, visible, rod has the largest diameter, and then the second largest diameter cylinder is inserted into the visible rod; and, then the third largest diameter cylinder is inserted into the second largest diameter cylinder. In embodiments, the rod of wheel system 106 may include more than three cylinders, such that every subsequent cylinder is fitted inside another cylinder. In other embodiments, the rod of wheel system 106 may include less than three cylinders such that only one subsequent cylinder is fitted inside the other cylinder.

In this alternate embodiment, the insertion of multiple cylinders inside each rod of each wheel 106 can be considered as to operate in a telescoping manner (similar to how a Victorian era telescope has different cylinders that can be extended or retracted out). In this alternate embodiment, an inside stop mechanism is positioned on the inside of each cylinder and at the same end of each cylinder, and an outside stop mechanism is positioned on the outside of each cylinder at the opposite end from the inside stop. In this alternate embodiment, a reversible, motorized actuator may be positioned within the telescoping rod so as to cause the rod to extend or retract, depending on communications provided to the actuator. Thus each rod of wheel system 106 can be a motorized telescoping unit connected to the swivel device, such that the overall length of the rod can be extended downwards from the swivel device or contracted towards the swivel device, as required by an actuator (e.g., motor driven actuator) within said telescoping unit. Alternatively, the overall length of the rod can be extended downwards from the swivel device or contracted towards the swivel device, as required, by no actuator but instead moves via gravitational force. If the overall length of the road changes based on gravitational force, then there is no actuator or motor located within each of rod of wheel system 106.

Figure 9A:
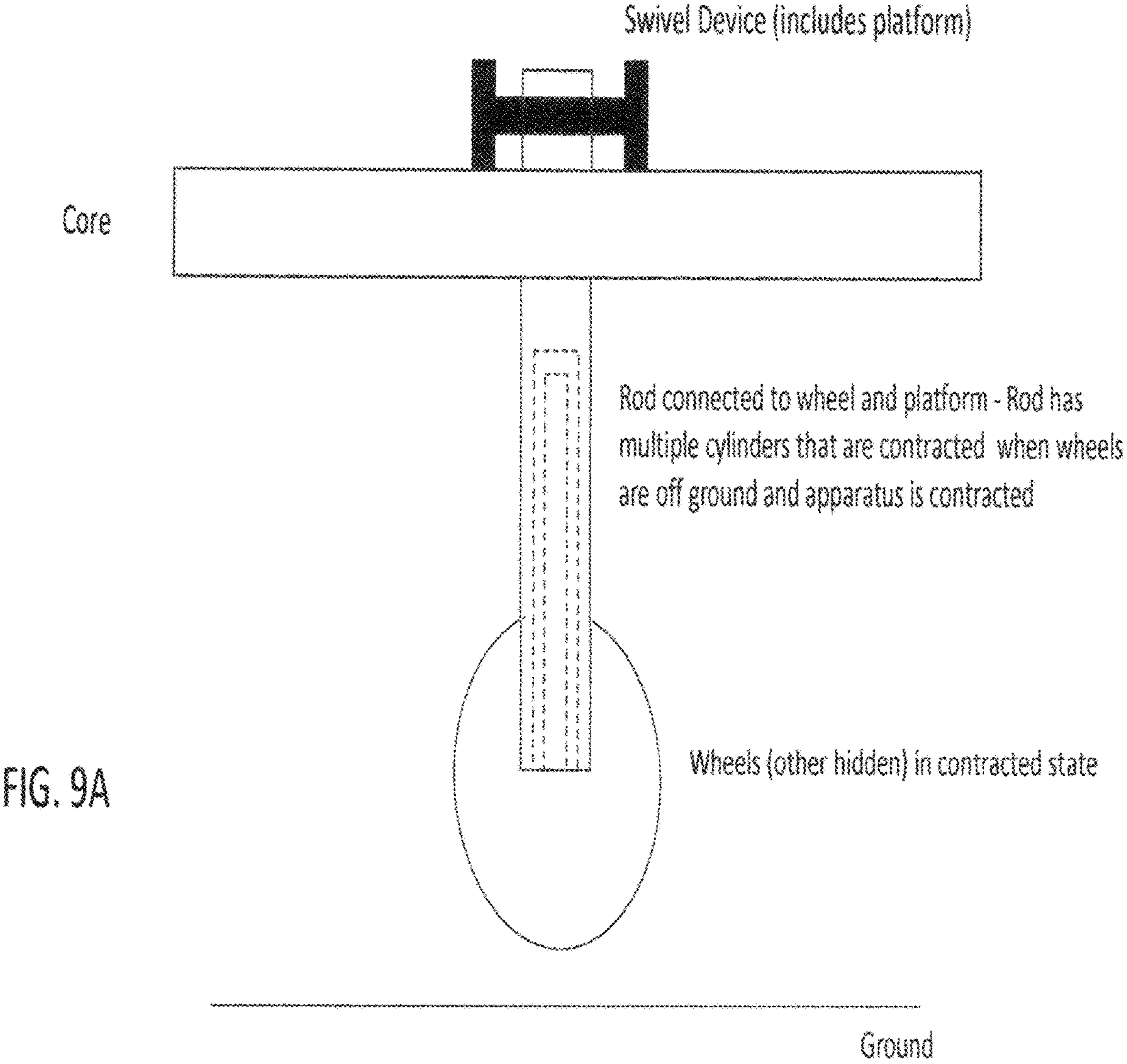
FIGS. 9A and 9B are example diagrams for expanding an example apparatus.
Figure 9B:
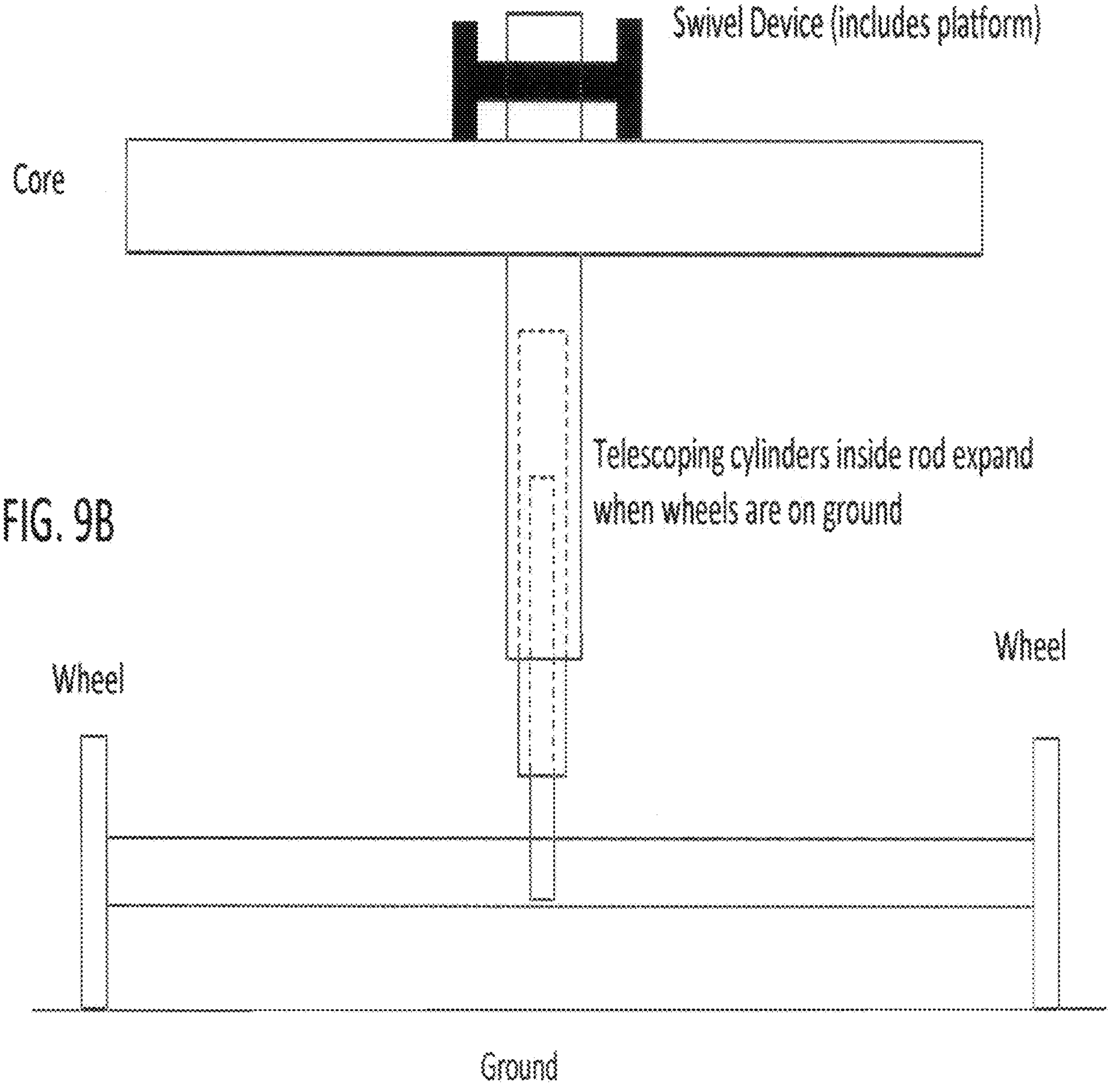

In a non-limiting example, when moving from the expanded state to a contracted state, the rod is retracted to a predetermined point as the support legs raise up the core, such that the wheel system may rotate, free from interference, from perpendicular to the core centerline to parallel to the core centerline, and if desired, can further retract to bring the wheel system closer to the bottom of the core for storage or transport. When moving from the contracted state to an expanded state, the telescoping rod is extended through use of the motorized actuator or force of gravity, first downward, if required, to a length allowing the rotation of the wheel system to rotate through using the swivel from parallel to the core centerline to perpendicular to the core centerline, and then, after rotation, downwards to lower the wheel system so that the wheels contact with the ground in further preparation for the expansion process. FIG. 9A shows an example of these features with each of two cylinders being contracted within the rod of wheel system 106. FIG. 9B shows an example of these features with the two cylinders being extended a particular length when wheel system 106 is touching the ground and the compactible apparatus is in an expanded state. In embodiments, the cylinders can contract from that shown in FIG. 9B and change from the expanded state in FIG. 9B back to the contracted state in FIG. 9A. Thus, the swivel device and platform do not move away from the core when the apparatus is in the expanded state. In embodiments, the features shown in FIGS. 9A and 9B may be similar to similarly named features in FIGS. 1A to 1H. In embodiments, the process shown in FIGS. 9A and 9B may be used for the apparatus described in FIGS. 1A to 1H instead of using the process shown in FIGS. 1J and 1K. Also, the process in FIGS. 9A and 9B may be used for the apparatus described in FIGS. 2A to 2C and FIGS. 3A to 3C. Also, the process in FIGS. 9A and 9B may be used for the apparatus described in FIGS. 4A and 4F instead of using the process shown in FIGS. 4B to 4E. In embodiments, the process shown in FIGS. 9A and 9B may include a computing device (such as described in FIG. 6) that can receive communications (such as described in FIG. 7) and result in movement of the described cylinders.

Figure 2A:
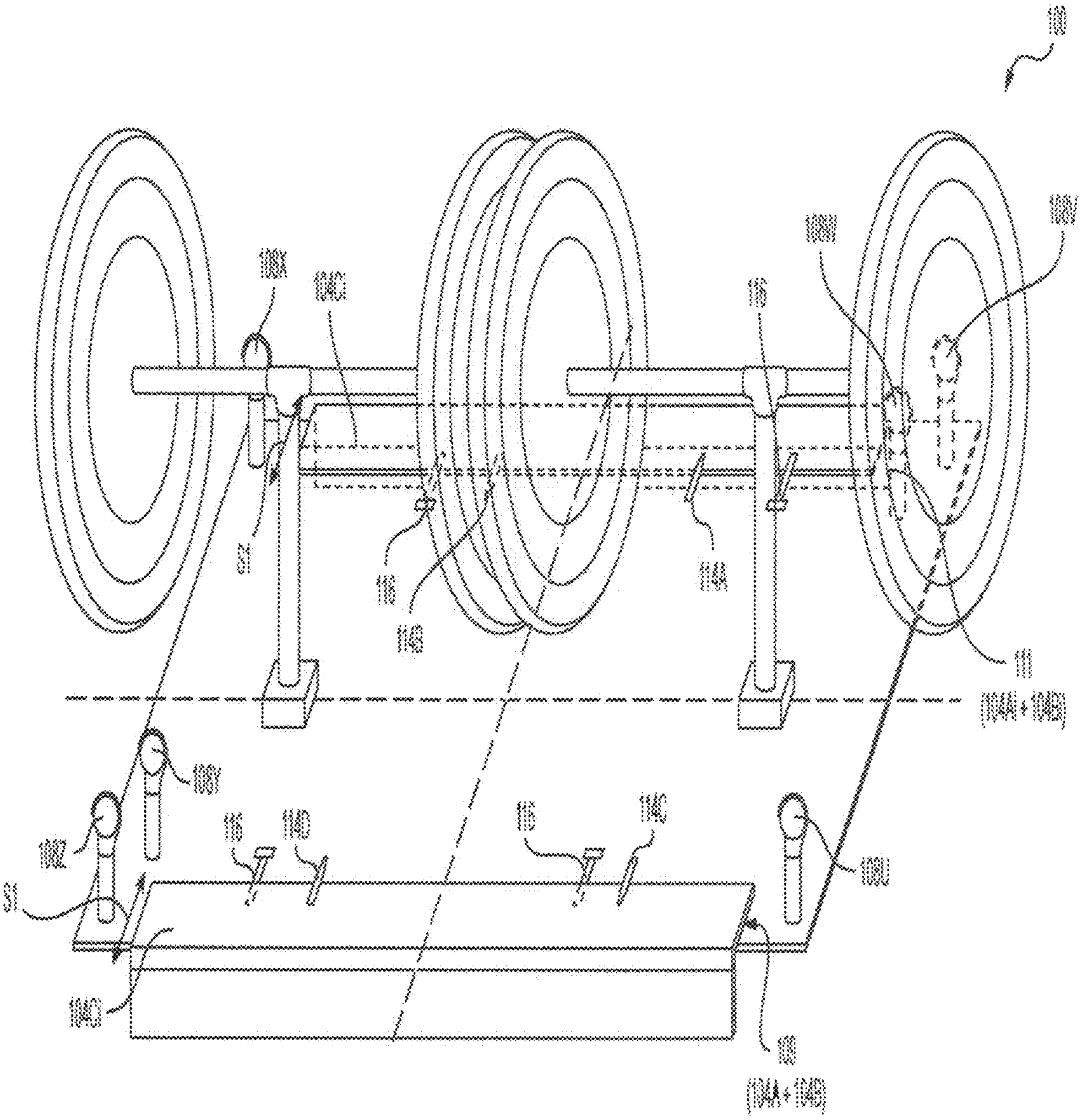
FIGS. 2A to 2C are diagrams of a process for expanding an example apparatus.
Figure 2B:
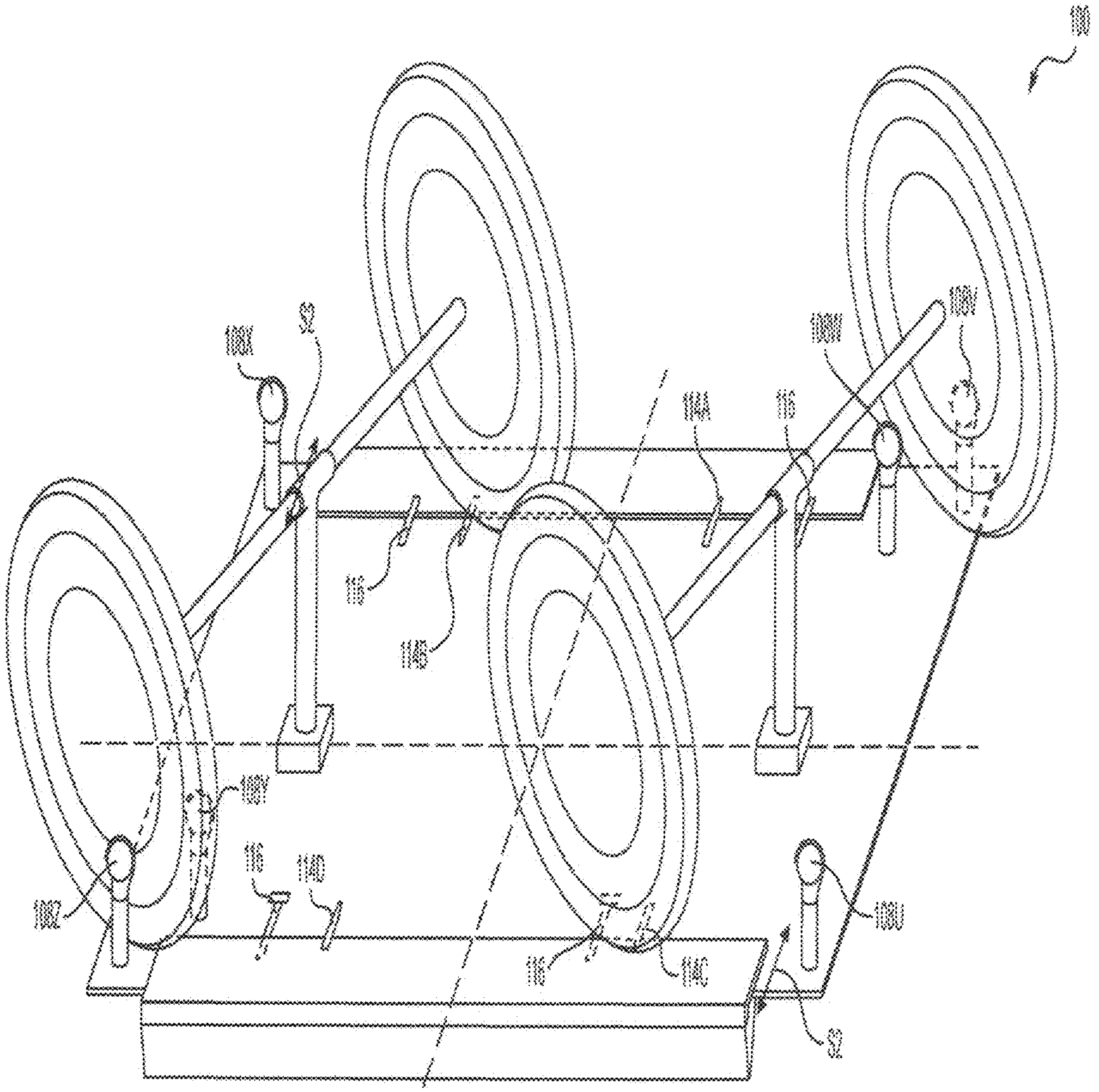
Figure 2C:
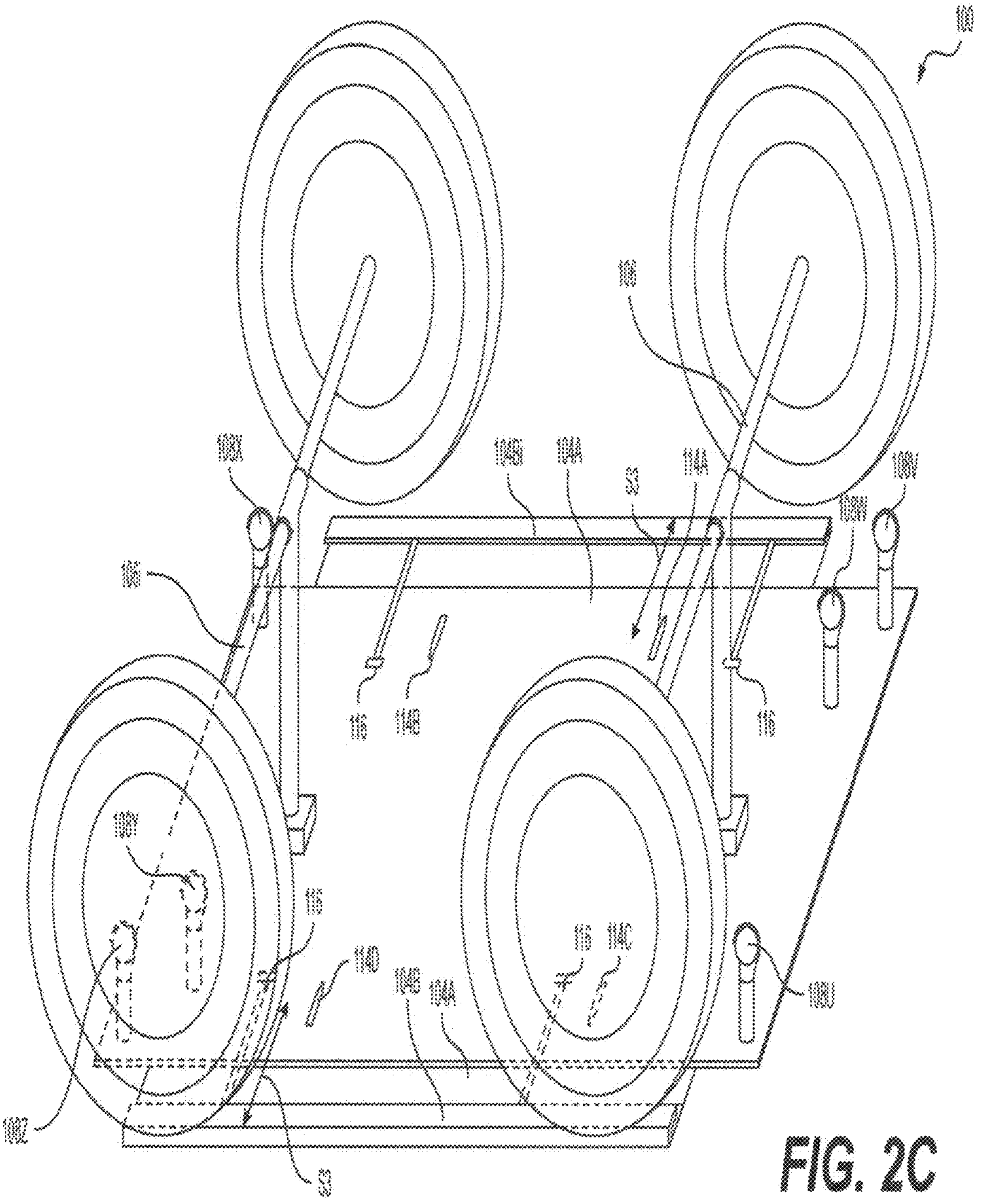

FIGS. 2A to 2C are diagrams of a process for expanding an example apparatus 100. FIG. 2A shows a bottom perspective view of core 102, of apparatus 100 as shown in FIG. 1C. In embodiments, the bottom surface of core 102 is shown as would be viewable from the ground. As shown in FIG. 2A, legs 108*u*, 108*v*, 108*w*, 108*x*, 108*y*, and 108*z* are attached to core 102 and each of these legs have a swivel wheel. In addition, each of the legs are connected to support actuators (support actuator 110*u* for leg 108*u*, support actuator 110*v* for leg 108*v*, support actuator 110*w* for leg 110*w*, support actuator 110x for leg 108x, support actuator 110y for leg 108y, and support actuator 110z for leg 108z) that are not visible as they are directly above each leg. In these example diagrams, sides 115 are removed so as to show the movement of example apparatus 100 from a compact state to an expanded state.

Also shown in FIG. 2A, are brackets 104C and 104Ci. In embodiments, bracket 104C is connected to side 109 and also to side actuators 114A and 114B. In embodiments, bracket 104Ci is connected to side 111 and also to side actuators 114C and 114D. In addition, connectors 116 are also shown. Thus, when apparatus 100 is being expanded, side actuators 114A and 114B move perpendicular to the center line of core 102 and move bracket 104C which in turn causes side 109 to expand and eventually become a flat surface that is flush, or nearly flush, with the top surface of core 102. Furthermore, when apparatus 100 is being expanded, side actuators 114C and 114D move perpendicular to the center line of core 102 and move bracket 104Ci which in turn causes the sections/parts of side 111 to expand and eventually become a flat surface that is flush, or nearly flush, with the top surface of core 102.

While not visible in FIG. 2A, platform 201 is connected to the top surface of core 102 with one platform 201 located at the top surface for wheel system 106 and another platform 201 located at the top surface for axles 106i. As FIG. 2A shows apparatus 100 to be in a contracted state, the top surface of core 102 is pushed up against the bottom of platform 201 (similar to that shown in FIG. 1J).

In embodiments, as shown in FIG. 2A, bracket 104C's back edge is at a distance s1 to the left edge of core 102. Similarly, bracket 104Ci's back edge is at a distance S1 to the right edge of core 102. In alternate embodiments, bracket 104Ci's back edge may be at a distance from the right edge of core 102 may be greater or less in distance than S1. In this non-limiting example, FIG. 2A wheels at the end of legs 108u, 108v, 108w, 108x, 108y, and 108z would be touching the ground if apparatus 100 was viewed from a top perspective.

In this non-limiting example, a user of apparatus 100 decides that he wishes to take apparatus 100 from a compact state (such as shown in FIG. 1C) to an expanded state (such as shown in FIG. 1B). To do so, the user presses a button (or some other actuation device) that sends an electronic communication to computing device 112 (not visible in FIG. 2A but visible in FIG. 1C). In this non-limiting example, computing device 112 sends electronic communications to wheel system 106, axles 106i, actuators 110u, 110v, 110w, 110x, 110y, and 110z, and side actuators 114a, 114b, 114c, and 114d.

As shown in FIG. 2B, as wheel system 106 begins to move to leg 108v, support actuator 110v retracts leg 108v causing support leg 108v to raise to a height sufficient to allow wheel system 106 to continue to rotate past support leg 108v and toward support leg 108w. Once wheel system 106 is past the position of support leg 108v, support actuator 110v extends to cause support leg 108v to lower to the ground/floor surface. In embodiments, the movement of wheel system 106, leg 108v, and support actuator 110v is based on electronic communications from computing device 112.

Also, as shown in FIG. 2B, as wheel system 106i begins to move to leg 108y, support actuator 110y retracts leg 108y to raise leg 108y to a height sufficient to allow wheel system 106i to continue its rotation to a position perpendicular to the core centerline. Once axle/wheel assembly 106i is past leg 108y, support actuator 110y extends to cause support leg 108y to lower to the ground/floor. In embodiments, the movement of wheel system 106i, leg 108y, and support actuator 110y is based on electronic communications from computing device 112.

Also, as shown in FIG. 2B, side actuators 114A, 114B, 114C, and 114D are moving sections 104C and 104Ci away from the edges of core 102. As shown in FIG. 2B, bracket 104C's back edge is at a distance s2 to the left edge of core 102 Similarly, bracket 104Ci's back edge is at a distance s2 to the right edge of core 102. In this non-limiting example, s2 is a greater value/distance than s1 shown in FIG. 2A. In embodiments, side actuators 114A, 114B, 114C, and 114D may move at the same time as support actuators 110u-110z (110u, 110v, 110w, 110x, 110y, and 110z) or at a different time.

As shown in FIG. 2C, support actuator 110w retracts leg 108w to raise leg 108w to a height sufficient to allow axle/wheel assembly 106 to continue its rotation to a position perpendicular to the core centerline. Once wheel system 106 is past leg 108w, support actuator 110w extends to cause leg 108w to lower to the ground/floor. Thus, as shown in FIG. 2C, wheel system 106 is now perpendicular to the centerline of core 102 with the wheels of wheel system 106 on the left and right side of core 102.

Also, as shown in FIG. 2C, support actuator 110z retracts leg 108z to raise leg 108z to a height sufficient to allow wheel system 106i to continue its rotation to a position perpendicular to the core centerline. Once wheel system 106 is past leg 108z, support actuator 110z extends to cause support leg 110w to lower to the ground/floor. Thus, as shown in FIG. 2C, wheel system 106i is now perpendicular to the centerline of core 102 with the wheels of wheel system 106i on the left and right side of core 102.

Also, as shown in FIG. 2C, side actuators 114A, 114B, 114C, and 114D continue moving sections 104C and 104Ci away from the edges of core 102. In doing so, sides 104A and 104B have become flat on the left side and 104Ai and 104Bi have become flat on the right side. As shown in FIG. 2B, bracket 104C's back edge is at a distance S3 to the left edge of core 102. Similarly, bracket 104Ci's back edge is at a distance S3 to the right edge of core 102. In this non-limiting example, S3 is a greater value/distance than s2 shown in FIG. 2B.

Once the wheels of axles 106 and 106i are on the left and right sides of core 102, legs 108u, 108v, 108w, 108x, 108y, and 108z are contracted up away from the ground so that apparatus 100 can be moved based on the wheels of axles 106 and 106i without any interference from legs 108u, 108v, 108w, 108x, 108y, and 108z. In embodiments, wheel system 106 and 106i have been moved downwards so that the wheels of axles 106 and 106i are touching the ground. As shown in FIGS. 2A-2C, axles 106 and 106i both rotate towards the left side when apparatus is moving from a contracted state to an expanded state.

While not visible in FIG. 2C, since the wheels of axles 106 and 106i are touching the ground, the rod for each of axles 106 and 106i have moved down and core 102 has also moved lower and away from platform 201 in a manner similar to FIG. 1K.

Accordingly, by having a pair of legs (legs 108v and 108w, and legs 108y and 108z) at two of the corners, the location of the support legs provides stability such that apparatus 100 can tolerate weight distributions for items that can be placed or attached to the top surface of apparatus 200. Thus, the four actuator support legs are positioned in a manner so as to prevent apparatus 200 from becoming unbalanced when in the compact state, whether stationary or when moving.

For apparatus 100 to contract (i.e., become compact), apparatus 100 changes from the expanded state shown in FIG. 2C back to FIG. 2A. Thus, the order of the support legs'movements occurs as described in FIGS. 2A to 2C except in reverse order. Also, sides 109 and 1111 change from an expanded state shown in FIG. 2C, then transitioning in FIG. 2B, and contracting as shown in FIG. 2A. Accordingly, axles 106 and 106*i* move back in the direction that was shown in FIG. 2A from FIG. 2C such that each axle is back to being parallel to the core centerline of core 102. Furthermore, sections 104C and 104Ci also contracts back towards core 102 (and further discussed in FIGS. 5A to 5F).

Figure 3A:
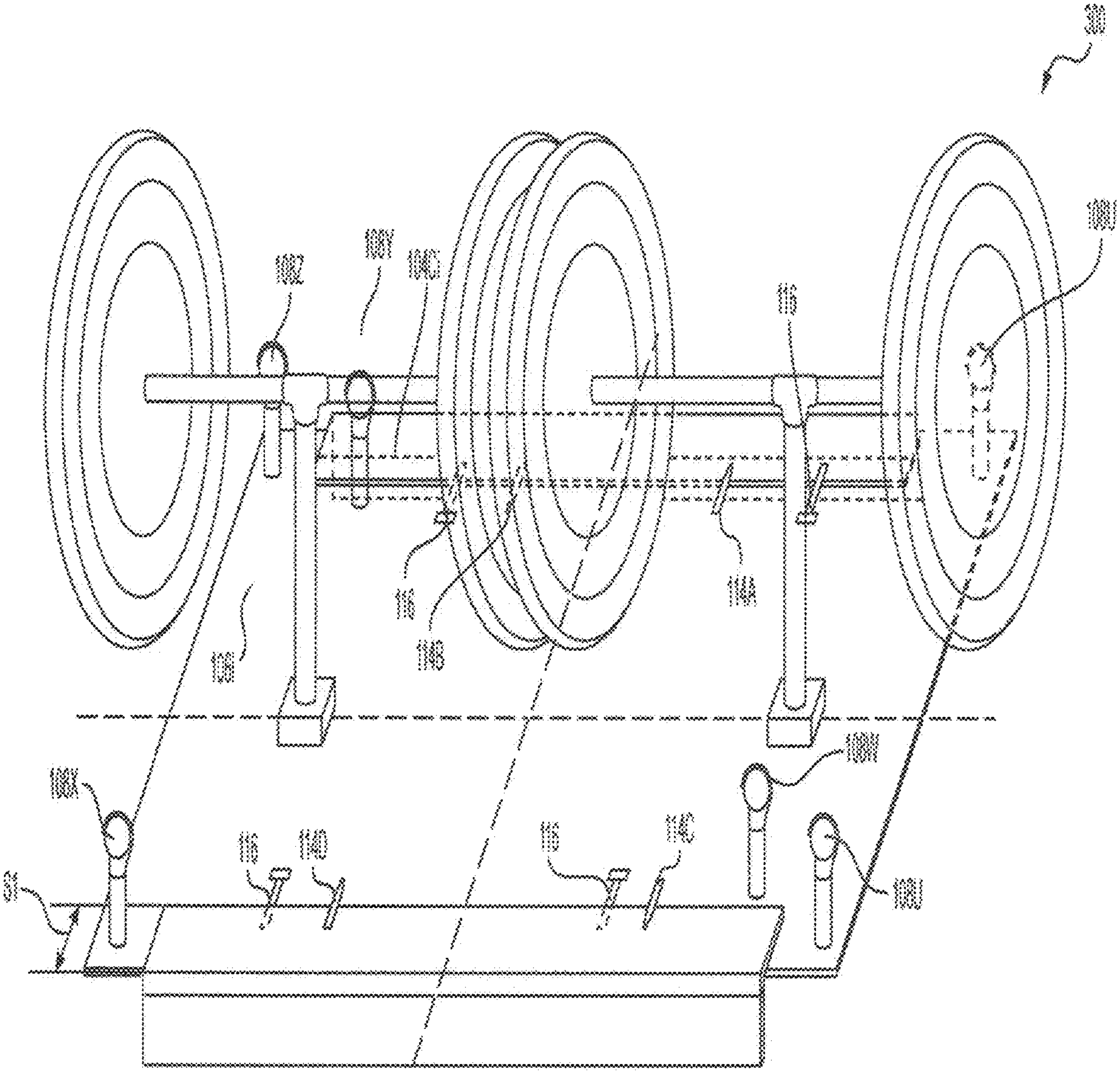
FIGS. 3A to 3C are diagrams of a process for expanding an example apparatus
Figure 3B:
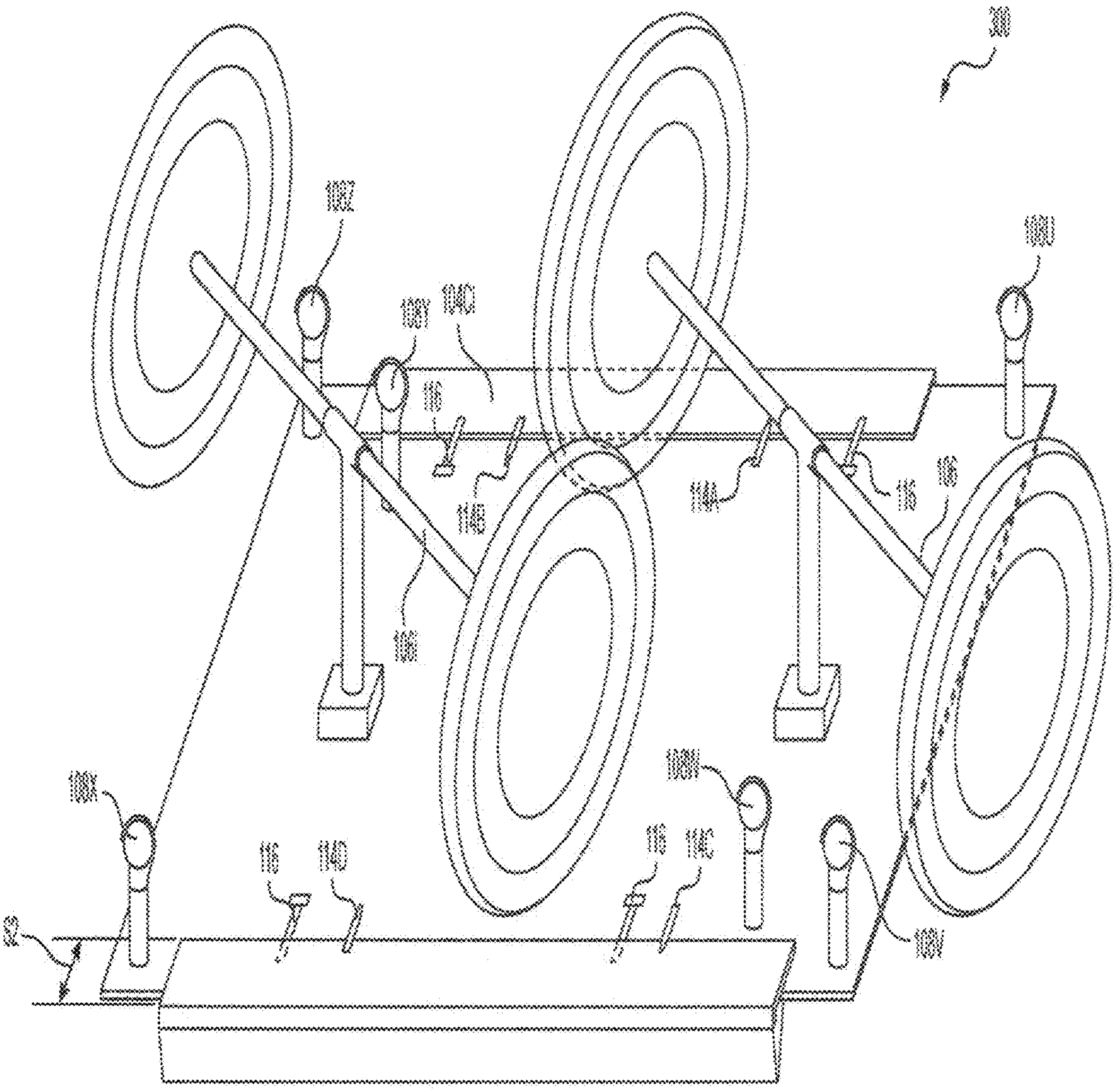
Figure 3C:
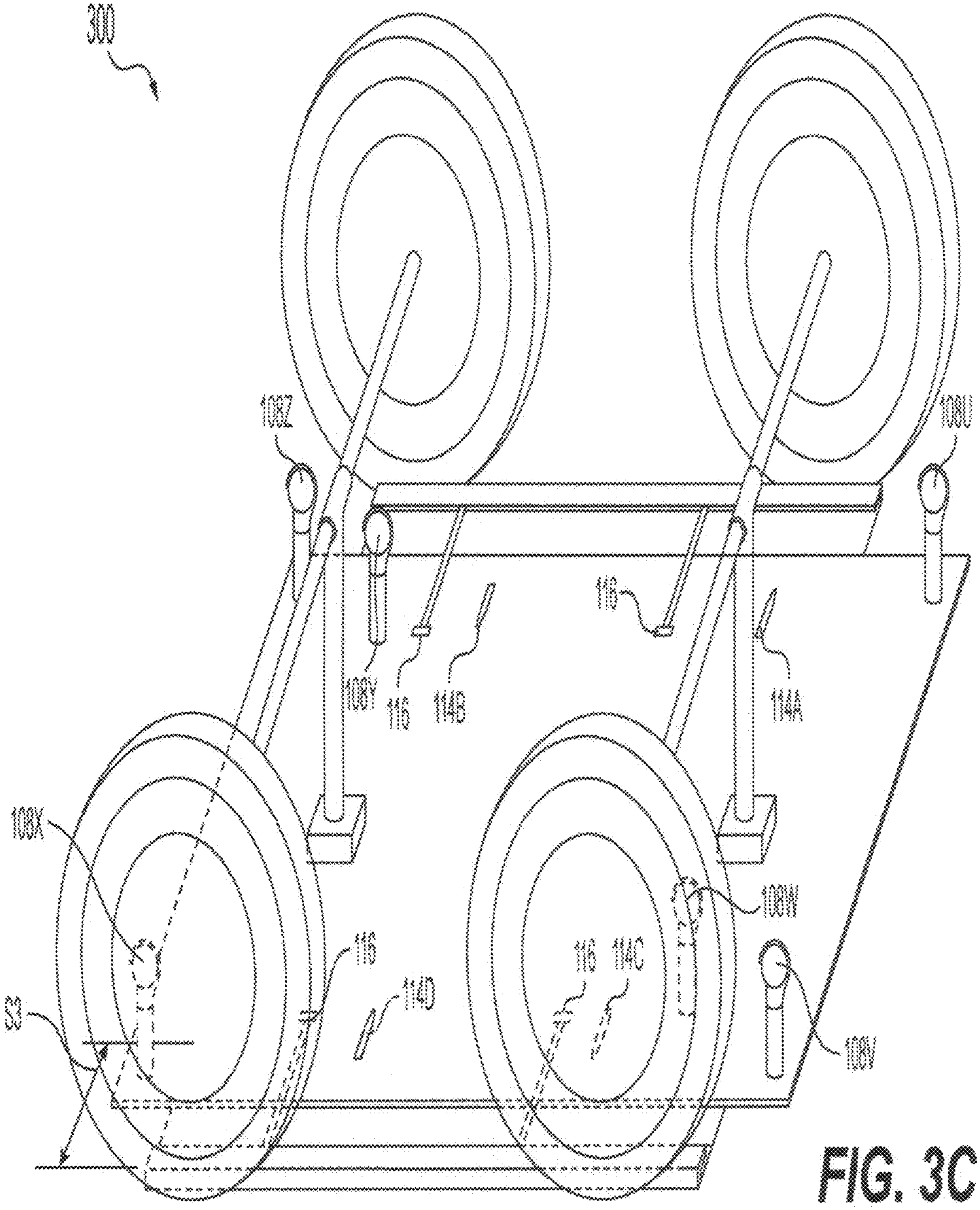

In FIGS. 3A-3C, apparatus 300 which is similar to apparatus 100 except the position of legs 108*u*, 108*v*, 108*w*, 108*x*, 108*y*, and 108*z* are changed such that when apparatus 100 is rotated from a contracted state to an expanded state, axles 106 and 106*i* both rotate towards the right side. Thus, FIGS. 3A-3C, legs 108*u*, 108*v*, 108*w*, 108*x*, 108*y*, and 108*z* still move in the same manner as described in FIGS. 2A-2C but with axles 106 and 106*i* rotating in a different direction.

FIGS. 4A to 4E are diagrams of a process for expanding an apparatus 400 which may be similar to apparatus 100 as described in FIGS. 1, 2A-2C, and 3A-3C.

Figure 4A:
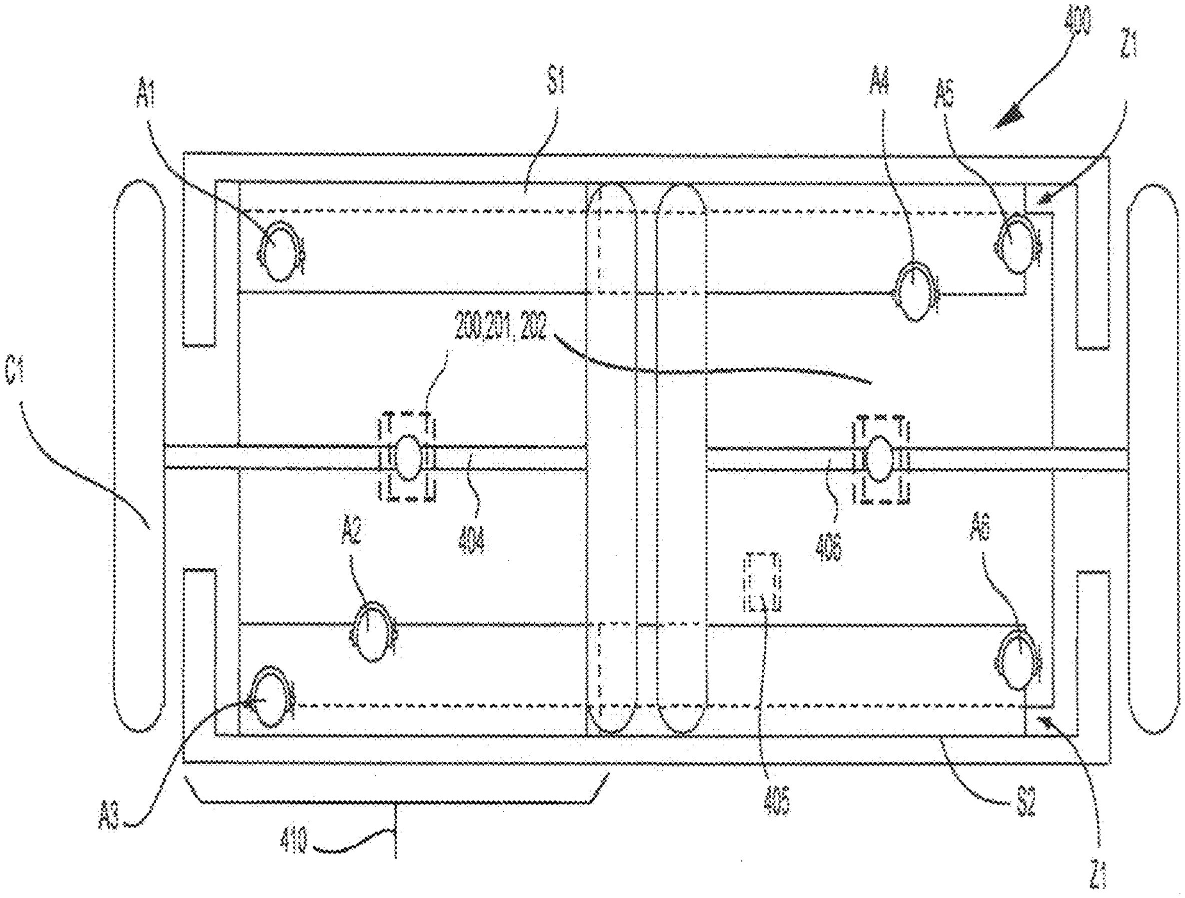
FIGS. 4A to 4F are diagrams of a process for expanding an example apparatus.

FIG. 4A shows apparatus a bottom perspective (as viewed from the ground) of apparatus 400 (e.g., similar to apparatus 100). As shown in FIG. 4A, core 402 has a front, back, right side, and a left side. In addition, legs A1, A2, A3, B1, B2, and B3 are shown in the approximate corners of core 402. In this example, legs A1, A2, A3, B1, B2, and B3 have actuators that have the leg incorporated as part of the actuator along with each leg having a swivel wheel. In FIG. 4A, apparatus 400 is considered to be in a contracted state (similar to that of apparatus 100 as shown in FIG. 1C). Also, as shown in FIG. 4A, the top view of sides S1 and S2 are shown. Device 405 is shown in FIG. 4A and is similar to computing device 112 and is attached to the bottom of core 402.

In this non-limiting example, a front perspective will be shown of the movement of axle 402. Thus, as shown in FIG. 4A, only section 410 is being shown in FIGS. 4B to 4E for the purpose of showing a front perspective of how one of the axles, wheel system 404 (similar to wheel system 106), moves when apparatus 400 moves from a contracted state to an expanded state. While axle 406 is also moving, FIGS. 4B to 4D only show the movement of wheel system 404 as it rotates from a contracted state to an expanded state. Furthermore, FIGS. 4B to 4D do not show any side actuators (e.g., 114A to 114D) that move sides S1 and S2 from a contracted state to an expanded state.

Figure 4B:
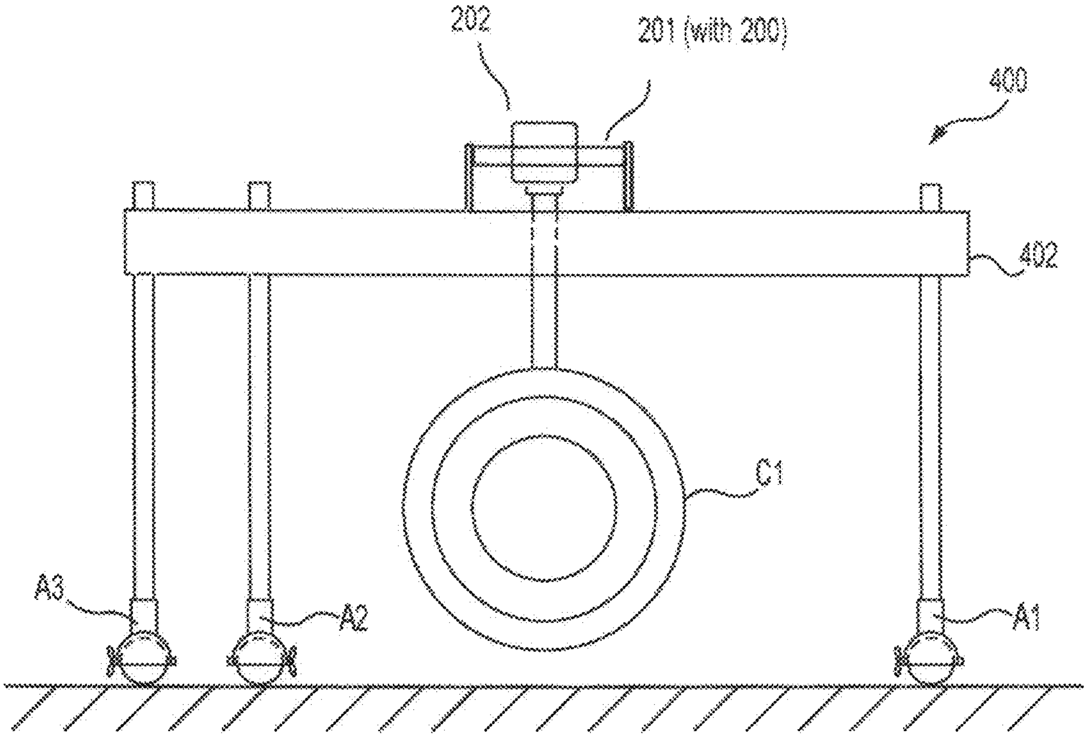
Figure 4C:
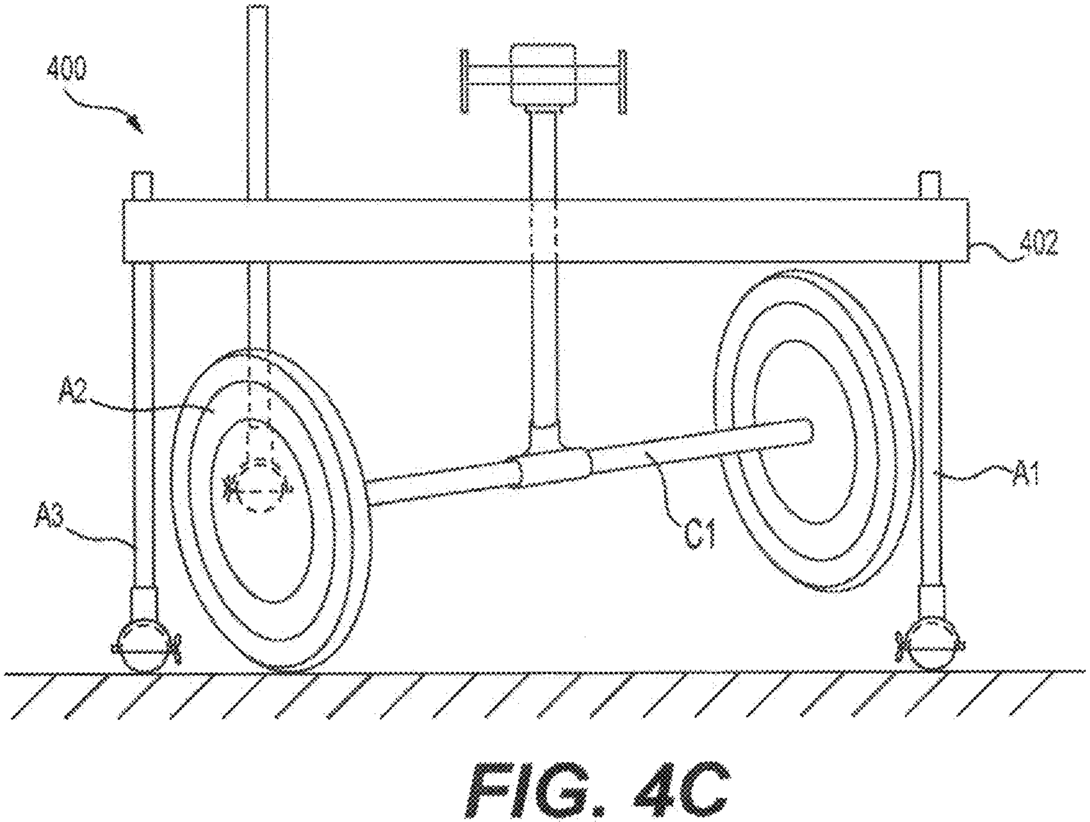

FIG. 4B is a diagram of section 410 of apparatus 400 as viewed from the front. From this perspective view, the wheel (C1) of wheel system 404, A1, A2, and A3 are viewable. Also, in this non-limiting example, an electronic command is sent to systems (e.g., from device 405) connected to apparatus 400 that starts the process of expanding apparatus 400 and, hence, the movement of wheel system 404. As shown in FIG. 4C, based on these electronic commands, wheel system 404 moves towards A2 and A3. In addition, the wheel of A2 moves upwards (via the same electronic command from device 405) that moves wheel system 404 while the wheel of A3 keeps touching the ground.

Figure 4D:
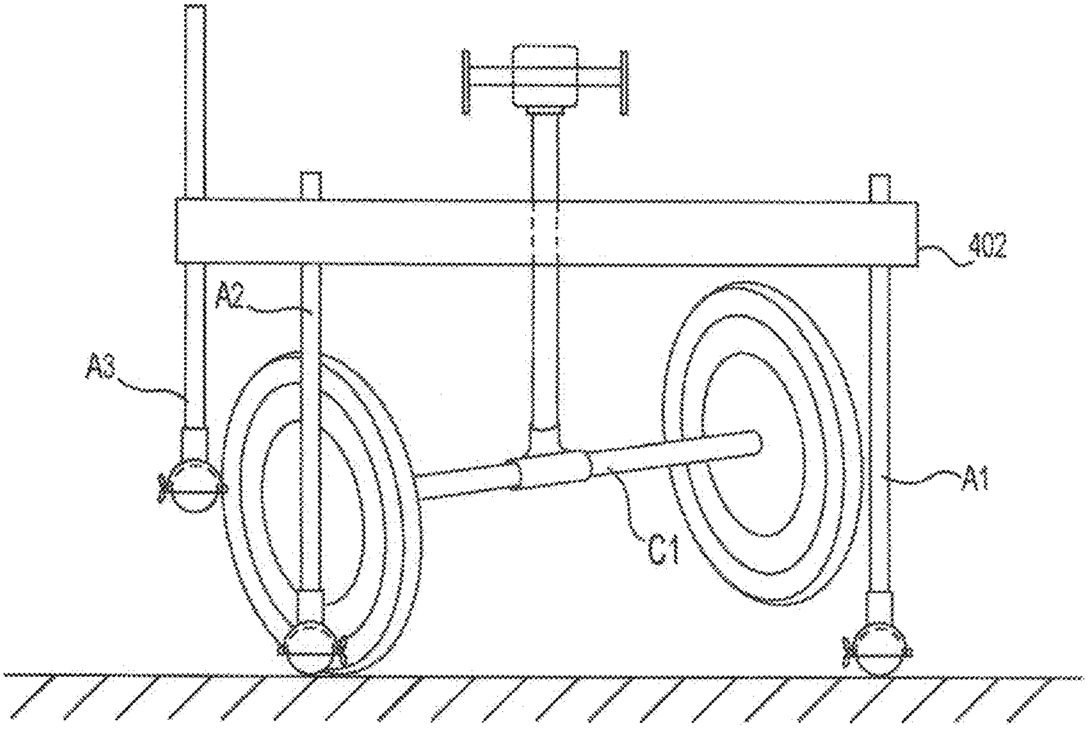

As shown in FIG. 4D, wheel system 404 continues to move. In this non-limiting example, A2 moves back down (as device 405 sends a command to move A2) with the wheel of A2 touching the ground while A3 moves upwards (as device 405 sends a command to move A3) such that the wheels of wheel system 404 can move below A3. Accordingly, wheel system 404 continues to move and is now, as shown in FIG. 4E, perpendicular to the centerline of core 302.

As shown in FIGS. 4B, 4C, and 4D, as wheel system 404 is off the ground and is being rotated, core 402 is pushed up against platform 403 in a manner similar to that shown in FIG. 1J. In FIG. 4E, as wheel system 404 is now touching the ground, this indicates that core 402 has been moved down and away from platform 403 in a manner similar to that shown in FIG. 1K.

Figure 4E:
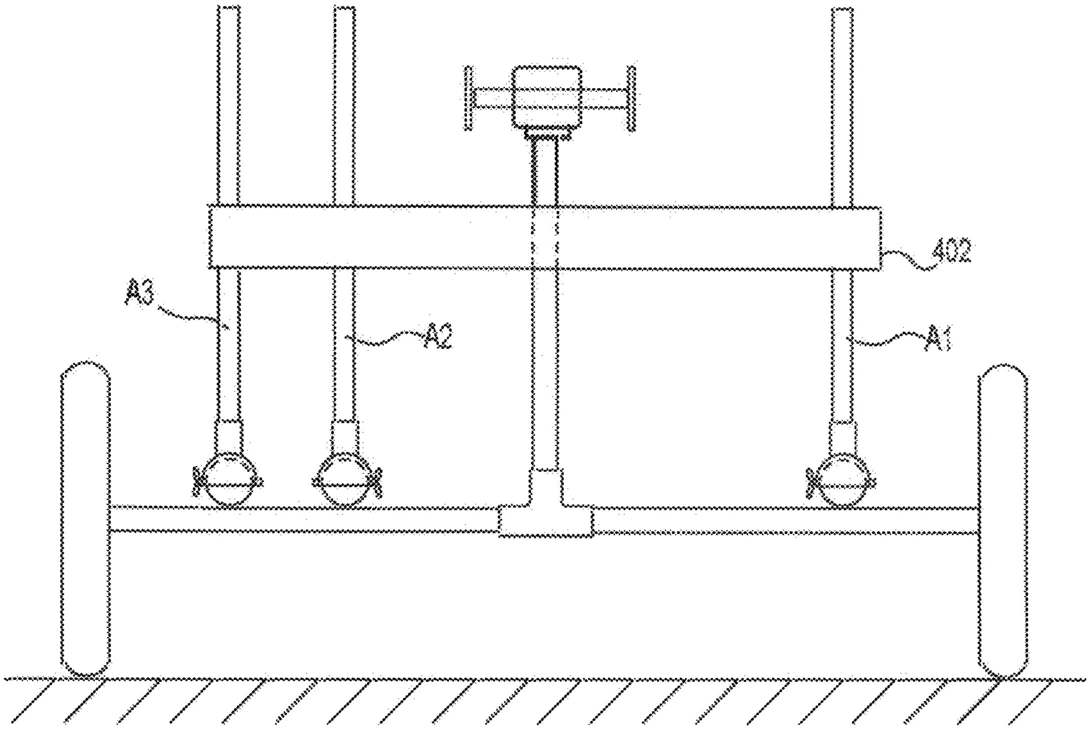

In FIG. 4E, the wheels of wheel system 404 touching the ground as legs A1, A2, and A3 have now all been moved upwards so that the wheels of wheel system 404 will now be used to move apparatus 300 around. Even though not shown in FIGS. 4B to 4E, axle 406 moved in tandem with wheel system 404 and will also be shown with its wheels located on the left and right sides of apparatus 400.

Figure 4F:
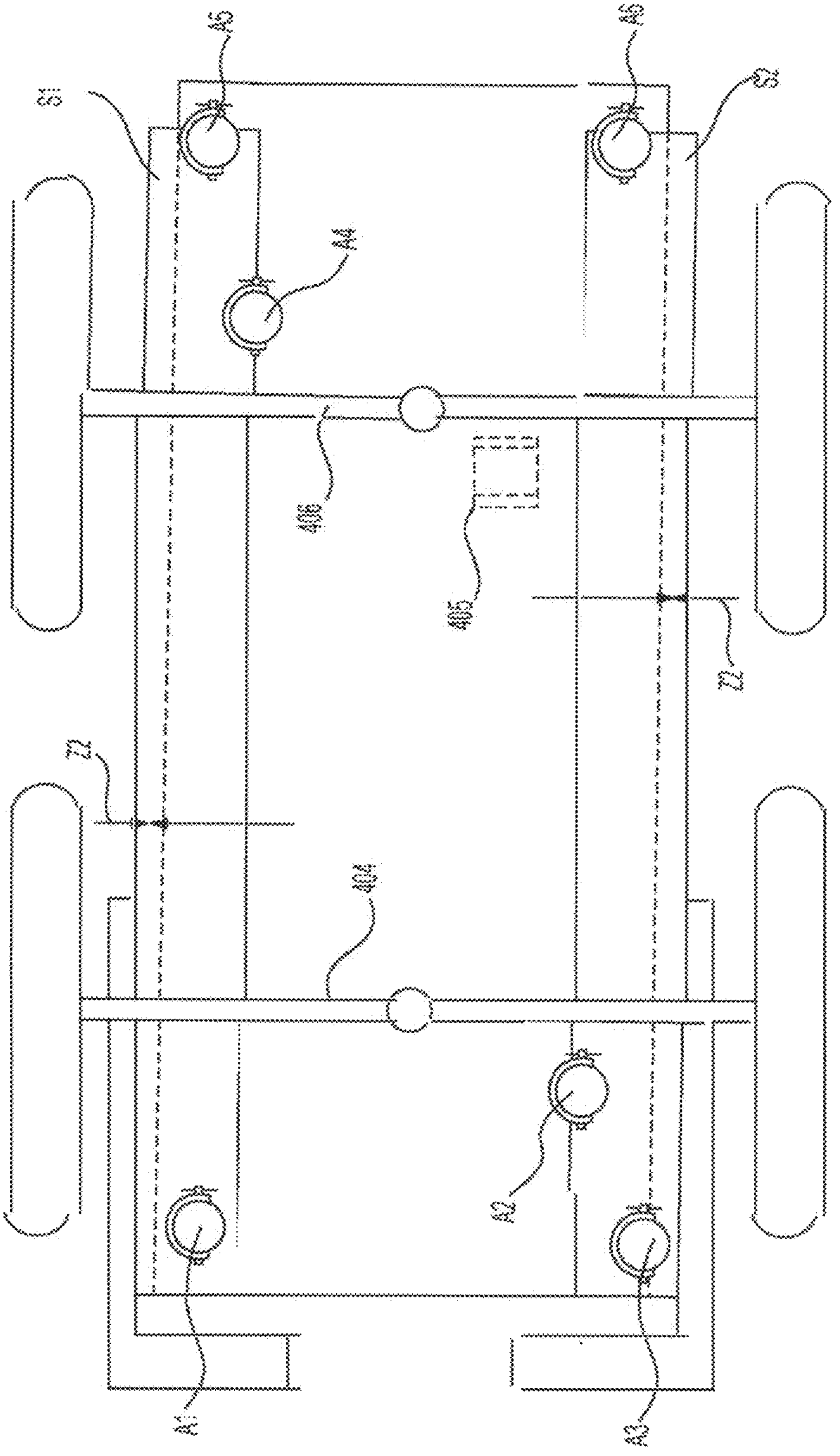

FIG. 4F, like FIG. 4A, shows a bottom perspective view of apparatus 400 with the position of wheel system 404 now at the sides of apparatus 400. As shown in FIG. 4F, wheel system 404 is now perpendicular to the centerline of core 402 and apparatus 400 is now in an expanded state (similar to apparatus 100 as shown in FIG. 1B). Also, as shown in FIG. 4F, axle 406 is also perpendicular to the centerline of core 402 since axle 406 also moved (simultaneously or at a later time) to a position similar to wheel system 404. Also, as shown in FIG. 4F, side S1 is at a distance of z3 from core 302 and side S2 is at a distance of z3 from core 302. In this non-limiting example, z3 is greater than the value of z2.

FIGS. 5A to 5I show how example sides of an example apparatus (e.g., apparatus 100) move from a contracted state to an expanded state. In this non-limiting example, FIGS. 5A to 5I only show a portion of apparatus 100 (e.g., section 501). For this non-limiting example, FIGS. 5A to 5I show a portion of an apparatus that is the left side of an apparatus (e.g., apparatus 100), with a portion of a bracket (bracket 1), a portion of a (core 1), a portion of one component of a foldable section (slide 1), a portion of a first hinge (hinge 1), a portion of a second hinge (hinge 2), and a portion of a third hinge (hinge 3). In embodiments, slide 1 may be similar to a portion of foldable sections 104B or 104Bi; slide 2 may be similar to a portion of foldable sections 104A or 104Ai, core 1 may be similar to a portion of core 102; and, bracket 1 may be similar to a portion of bracket 104C.

Figure 5A:
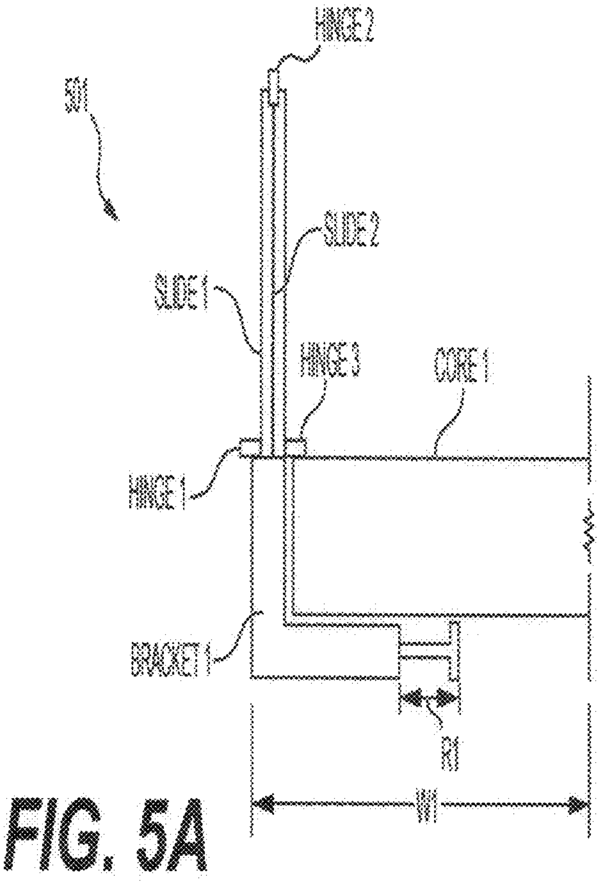
FIGS. 5A to 5I are diagrams of an example process for expanding an example apparatus.

In embodiments, foldable sections slide 1 and slide 2 make up a portion of side 109 as described in FIGS. 1A-1F. As shown in FIG. 5A, slide 1 is connected to bracket 1 by hinge 1. Also, as shown in FIG. 5A, slide 1 is connected to slide 2 by hinge 2. Also, as shown in FIG. 5A, slide 2 is connected to core 1 by hinge 3. As will be further described in FIGS. 5B-5I when an apparatus moves from a contracted to an expanded state, bracket 1 moves away from core 1, by being pushed by mover 1 (e.g., a side actuator 114A), and slide 1 also moves (i.e., slides) away from core 1 based on hinge 1. And, as slide 1 moves, slide 2 also moves as it connected to slide 1 by hinge 2 as well slide 2 being connected to core 1 based on hinge 3. Thus, in the expanded state, slides 1 and 2 are now parallel, adjacent, to the surface of core 1 with the top surfaces of slides 1 and 2 being flush or nearly flush with the top surface of core 1. The movement of slides 1 and 2 may occur at the same time or at another time to when an axle/wheel assembly (e.g., wheel system 106) moves from a parallel to a perpendicular position (e.g., as described in FIGS. 2A-2C).

FIG. 5A shows section 501 which is a portion of apparatus 100 in a contracted state. Section 501 is a portion of the left side of apparatus 100. FIG. 5A shows a side perspective of slides 1 and 2, core 1, bracket 1, mover 1, and hinges 1, 2, and 3. As shown in FIG. 5A, slides 1 and 2 are vertical and perpendicular to the top surface of core 1. As shown in FIG. 5A, bracket 1 is connected to the bottom surface of core 1 by mover 1 (which is connected to both bracket 1 and core 1). As shown in FIG. 5A, mover 1 is shown with a length of R1.

Figure 5C:
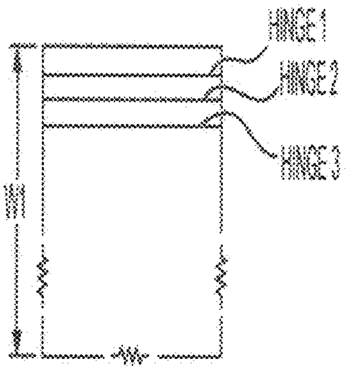
Figure 5B:
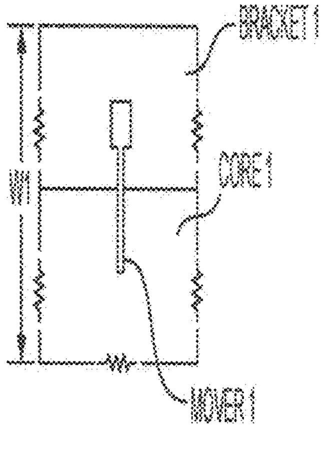

FIG. 5B shows a bottom perspective of the features of apparatus 100 described in FIG. 5A. As FIG. 5B shows a bottom perspective of the apparatus, slides 1 and 2 at this stage are not visible. Also, as shown in FIG. 5B, in the contracted state, there is a distance W1 between (a) the edge of bracket 1 furthest from core 1 and (b) and the edge of core 1.

FIG. 5C shows a top perspective of the features of section 501 as described in FIG. 5A. As the apparatus is in a contracted state, only hinges 1, 2, and 3 are visible and surfaces of slides 1 and 2 are not visible.

Figure 5D:
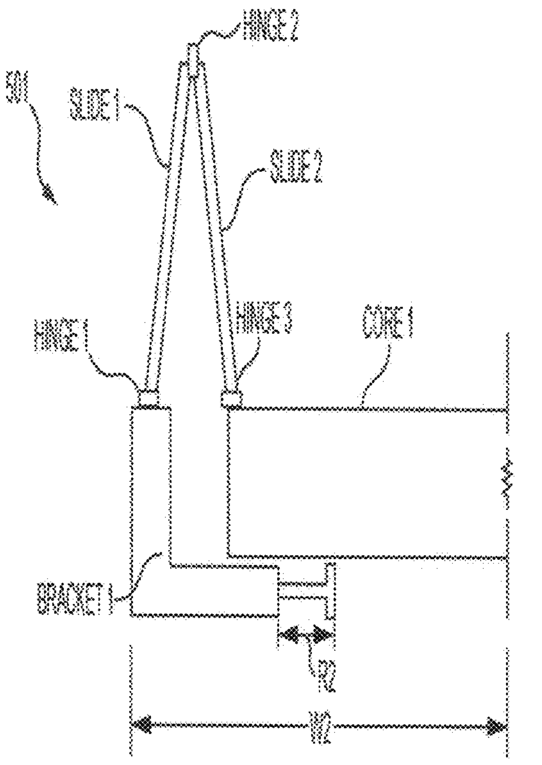

FIG. 5D shows section 501 which is a portion of apparatus 100 that is changing from a contracted state to an expanded state. As shown in FIG. 5D (which is a side perspective), mover 1, based on communications from a computing device (e.g., computing device 112) moves bracket 1 away from core 1. As shown in FIG. 5D, as bracket 1 is moved, slide 1 also moves based on slide 1 connected to bracket 1 by hinge 1. And, since bracket 1 is moving away, slide 2 also moves based on slide 2 connected to slide 1 by hinge 2, and based on slide 2 connected to the top surface of core 1 by hinge 3. FIG. 5D also shows mover 1 with a length of R2. In this non-limiting example, R2 is a greater length than R1.

Figure 5F:
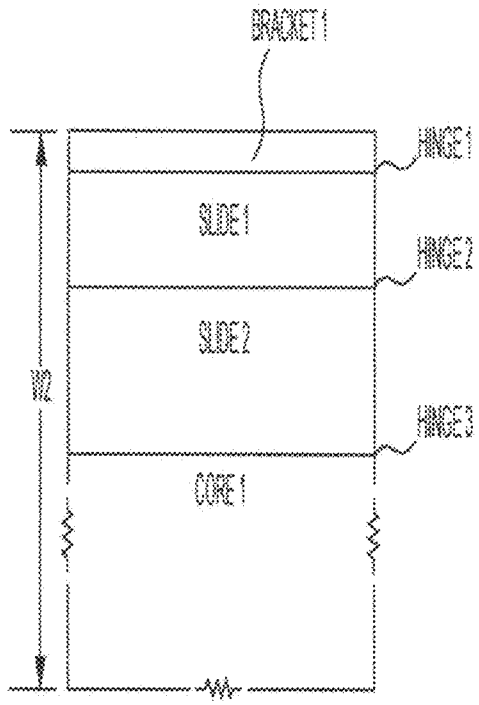
Figure 5E:
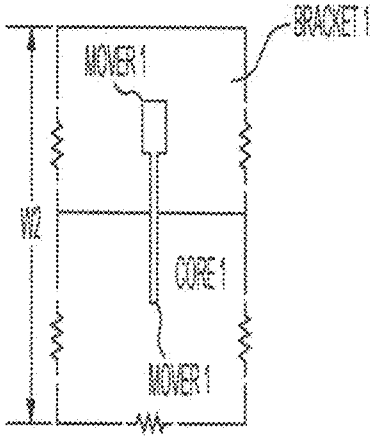

FIG. 5E show a bottom perspective of the portion of section 501 as shown in FIG. 5D. As shown in FIG. 5E, as bracket 1 moves away from core 1, there is a distance W2 between (a) the edge of bracket 1 furthest from core 1 and (b) and the edge of core 1.

FIG. 5F shows a top perspective of the portion of section 501 as shown in FIG. 5D. As bracket 1 has moved away from core 1, the surfaces of slides 1 and 2 are now visible. FIG. 5F also shows distance W2 described in FIG. 5E.

Figure 5G:
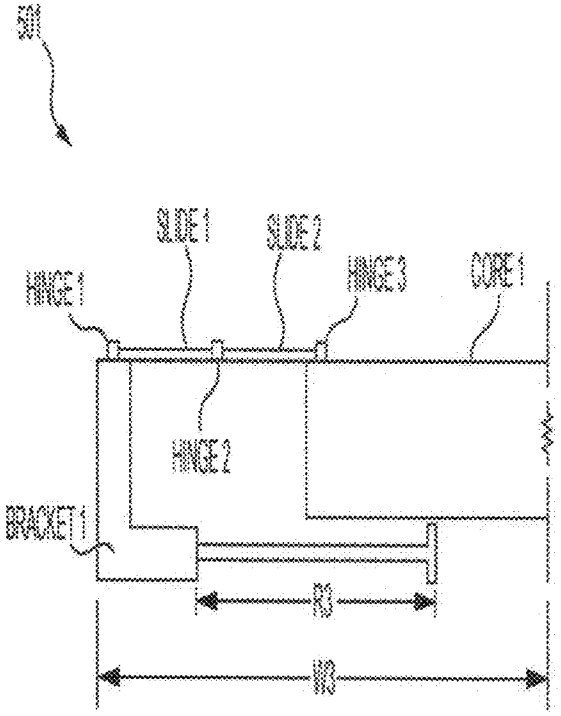

FIG. 5G shows a portion of apparatus 100 (section 501) that is in a fully expanded state. As shown in FIG. 5D (which is a side perspective), mover 1, based on communications from a computing device (e.g., computing device 112) moves bracket 1 away from core 1 to bracket 1's maximum position away from core 1. As shown in FIG. 5G (which is a side perspective view), bracket 1 has been moved (i.e., pushed out) such that slides 1 and 2 are parallel to the top surface of core 1 and the top surfaces of slides 1 and 2 are flush, or nearly flush, with the top surface of core 1. Also, as shown in FIG. 5G, mover 1 has a length of R3 which is greater than R2 described in FIG. 5D.

Figure 5I:
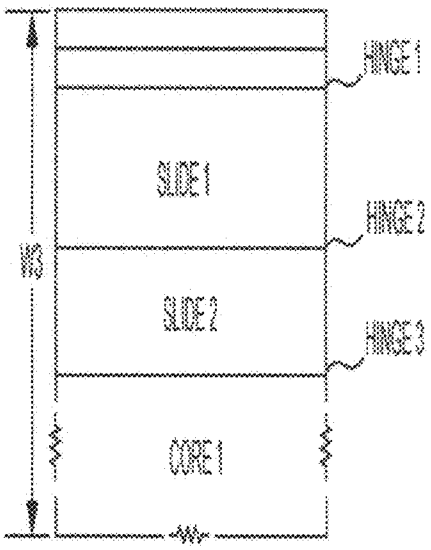
Figure 5H:
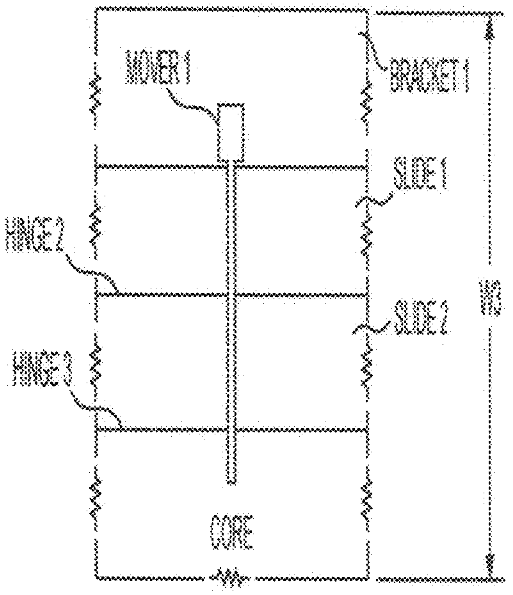

FIG. 5H shows a bottom perspective of section 501 as described in FIG. 5G. Since bracket 1 has moved away from core 1, an empty space is created below slides 1 and 2 such that slides 1 and 2 are now visible from the bottom perspective. As shown in FIG. 5H as bracket 1 is at its maximum distance from the edge of core 1, there is a distance W3 between (a) the edge of bracket 1 furthest from core 1 and (b) and the edge of core 1.

FIG. 5I shows a top perspective of section 501 as described in FIG. 5G. As shown in FIG. 5I, the top surfaces of slides 1 and 2 are now visible. FIG. 5I also shows distance W3 which is described in FIG. 5H.

Figure 6:
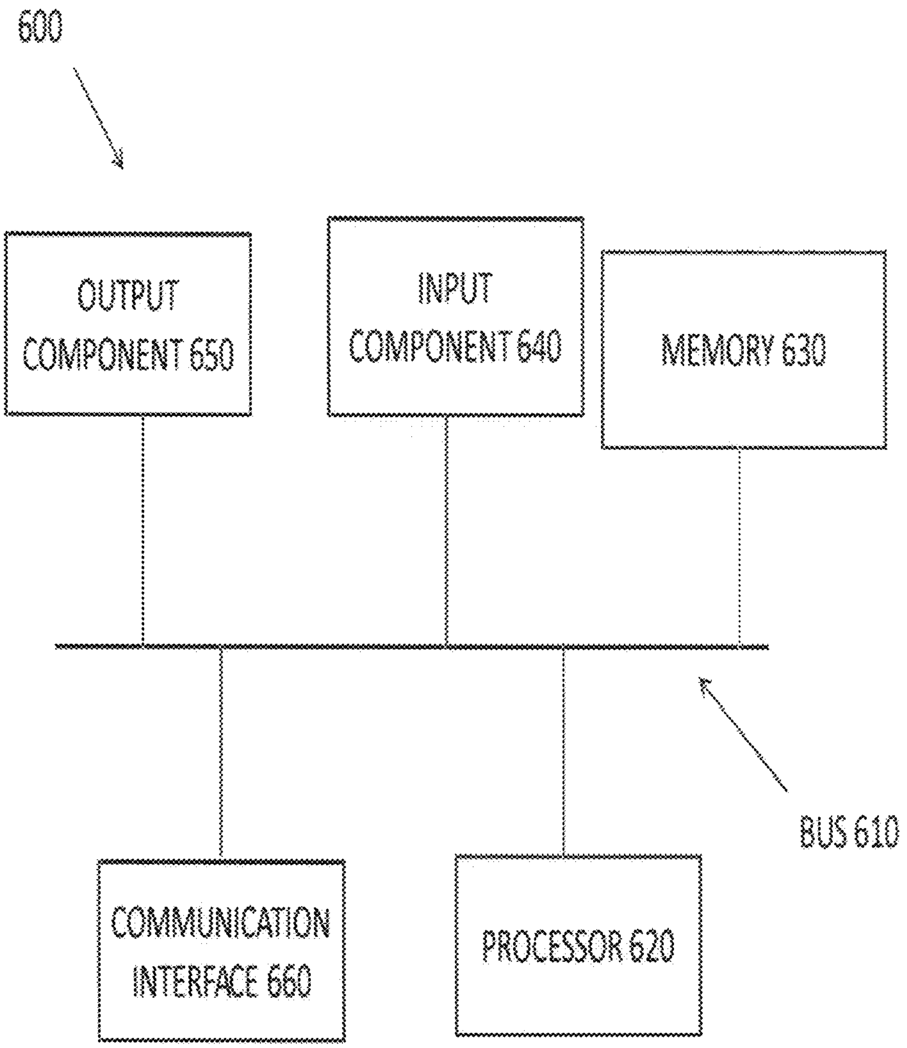
FIG. 6 is an example computing device.

FIG. 6 is a diagram of example components of a device 600. Device 600 may correspond to computing device 112, device 405, mover 1, side actuators 110A and 110B, 114A, 114B, 114C, 114D, and/or any other device with motor in any figure with a computer feature described (e.g., such as in FIG. 6 or in FIGS. 8A and 8B, describing apparatus 800). Device 600 may include one or more devices 600 and/or one or more components of device 600.

As shown in FIG. 6, device 600 may include a bus 610, a processor 620, a memory 630, an input component 640, an output component 650, and a communications interface 660. In other implementations, device 600 may contain fewer components, additional components, different components, or differently arranged components than depicted in FIG. 6. Additionally, or alternatively, one or more components of device 600 may perform one or more tasks described as being performed by one or more other components of device 600.

Bus 610 may include a path that permits communications among the components of device 600. Processor 620 may include one or more processors, microprocessors, or processing logic (e.g., a field programmable gate array (FPGA) or an application specific integrated circuit (ASIC)) that interprets and executes instructions. Memory 630 may include any type of dynamic storage device that stores information and instructions, for execution by processor 620, and/or any type of non-volatile storage device that stores information for use by processor 620. Input component 640 may include a mechanism that permits a user to input information to device 600, such as a keyboard, a keypad, a button, a switch, voice command, etc. Output component 650 may include a mechanism that outputs information to the user, such as a display, a speaker, one or more light emitting diodes (LEDs), etc.

Communications interface 660 may include any transceiver-like mechanism that enables device 600 to communicate with other devices and/or systems. For example, communications interface 660 may include an Ethernet interface, an optical interface, a coaxle interface, a wireless interface, or the like. In another implementation, communications interface 660 may include, for example, a transmitter that may convert baseband signals from processor 620 to radio frequency (RF) signals and/or a receiver that may convert RF signals to baseband signals. Alternatively, communications interface 660 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 660 may connect to an antenna assembly (not shown in FIG. 6) for transmission and/or reception of the RF signals. The antenna assembly may include one or more antennas to transmit and/or receive RF signals over the air. The antenna assembly may, for example, receive RF signals from communications interface 660 and transmit the RF signals over the air, and receive RF signals over the air and provide the RF signals to communications interface 660. In one implementation, for example, communications interface 660 may communicate with network 702.

As will be described in detail below, device 600 may perform certain operations. Device 600 may perform these operations in response to processor 620 executing software instructions (e.g., computer program(s)) contained in a computer-readable medium, such as memory 630, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

Figure 7:
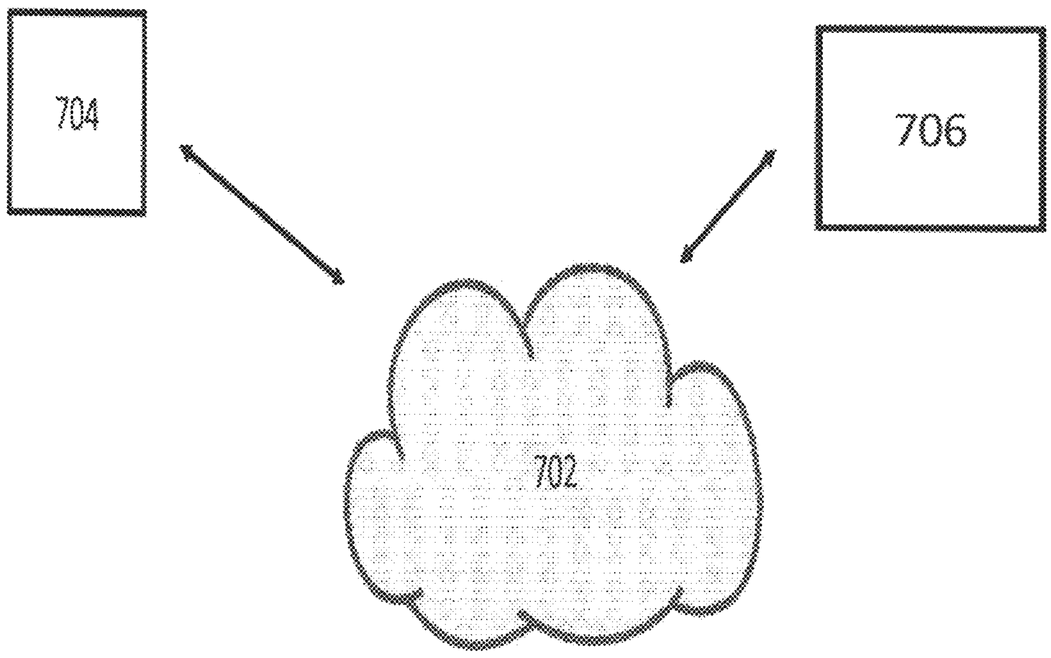
FIG. 7 is an example network.

FIG. 7 is a diagram of example environment 700 in which systems, devices, and/or methods described herein may be implemented. FIG. 7 shows network 702, computing device 704, and user device 706.

Network 702 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 702 may include a cellular network, a public land mobile network (PLMN), a second generation (2G) network, a third generation (3G) network, a fourth generation (4G) network, a fifth generation (5G) network, and/or another network. In embodiments, network 702 may allow for devices describe any of the described figures to electronically communicate (e.g., using emails, electronic signals, URL links, web links, electronic bits, fiber optic signals, wireless signals, wired signals, etc.) with each other so as to send and receive various types of electronic communications.

Computing device 704 may include any computation or communications device that is capable of communicating with a network (e.g., network 702). For example, computing device 704 may be a computing device similar to device 600 as described in FIG. 6 and computing device 112 as described in any of the above figures and may include programming to provide local navigation capability to enable the apparatus to move, based on user command, from one location to a different location.

User device 706 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device. In embodiments, user device 706 may, via network 702, send electronic communications to computing device 704.

Figure 8A:
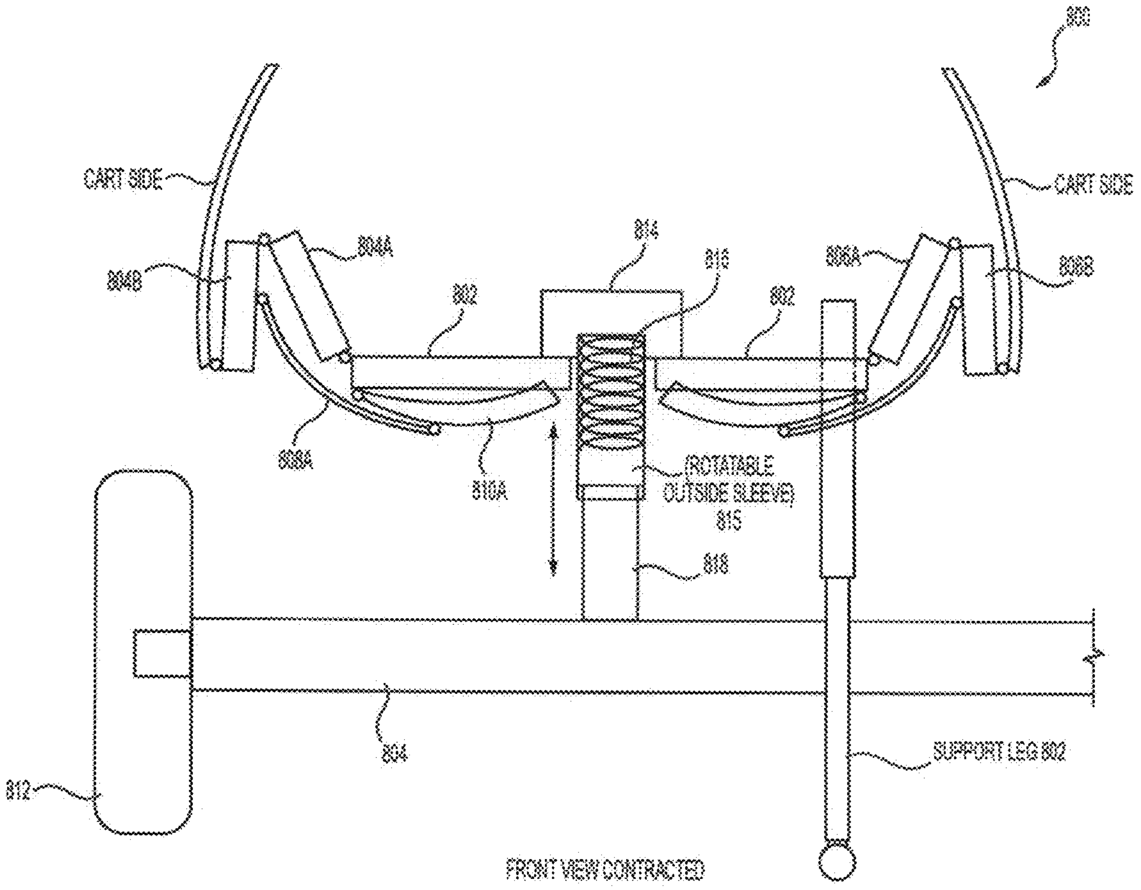
FIGS. 8A and 8B are diagrams of another example apparatus.
Figure 8B:
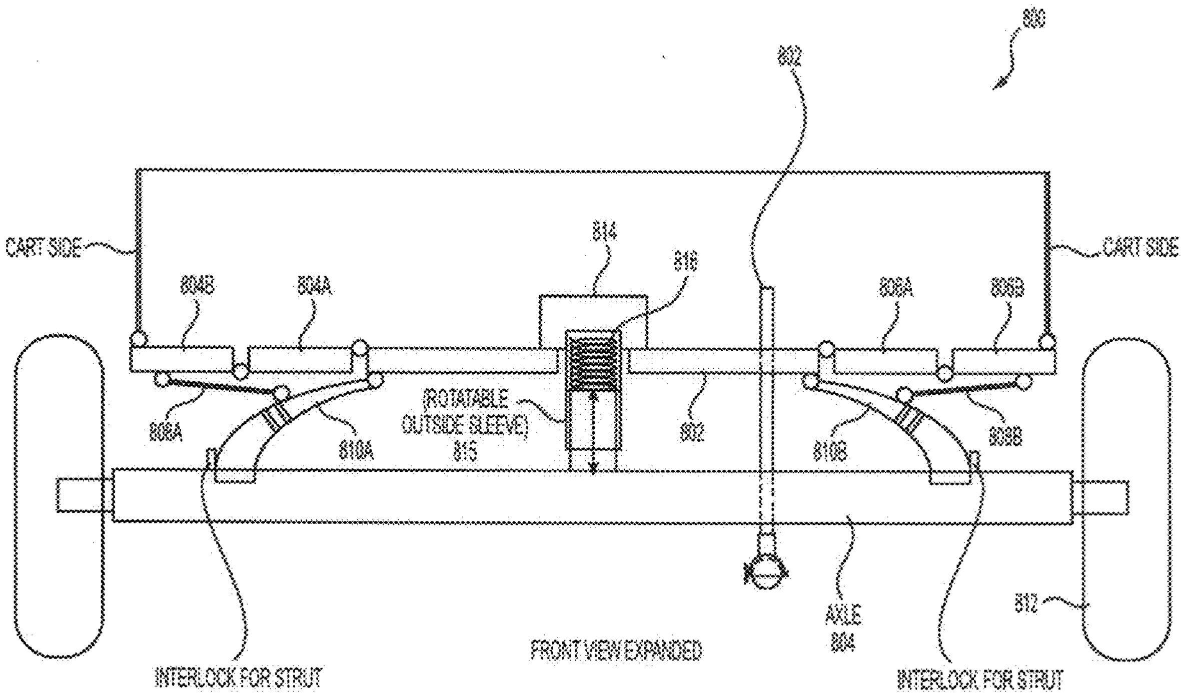

FIGS. 8A and 8B describe an example apparatus 800. In FIG. 8A, apparatus 800 is in a contracted sate. In FIG. 8B, apparatus 800 is in an expanded state. As shown in FIGS. 8A and 9B, apparatus 800 is shown with core 802, side 804A, side 804B, side 806A, side 806B, pull strap 808A, pull strap 808B, strut 810A, strut 810B, wheel system 812, servo-motor 814, swivel mechanism 815, spring system 816, inner support device 818, and support leg 830.

In embodiments, while not shown in FIG. 8A or 8B, apparatus 800 may have multiple support legs 830 similar to those support legs shown in FIGS. 1A and 1B. Furthermore, while FIGS. 8A and 8B only shows one wheel system 812 (which may be similar to wheel system 106 or 106*i*), apparatus 800 may have more than one wheel system 812 that are located on core 802 in a manner similar to wheel systems 106 and 106*i* located on core 102 as shown in FIGS. 1A and 1B.

In FIG. 8A, apparatus 800 is shown a contracted state, such that the wheels of wheel system 812 are not touching the ground. In this non-limiting example, as apparatus 800 is in the contracted state, sides 804A, 804B, 806A, and 806B are approximately perpendicular to core 802. As shown in FIG. 8A, side 804A is connected to side 804B via a hinge. Alternatively, side 804A can be connected to side 804B using other systems (e.g., skewer pins, wire loops Velcro, and any other connector system). As shown in FIG. 8A, pull strap 808A is connected to side 804B and pull strap 808A is also connected to strut 810A. As shown in FIG. 8A, strut 810A is connected to core 802 via a spring-loaded hinge that can provide positive pressure to fold strut 810A under core 802. In embodiments, a hinge stop is also provided next to the spring-loaded hinge with the hinge stop attached to core 802.

As shown in FIGS. 8A and 8B, servo-motor 814 is connected to core 802. Also, as shown in FIGS. 8A and 8B, swivel mechanism 815 is connected to servo-motor 814 with swivel mechanism 815 having an inner support device 818 such that inner support device 818 is connected to the axle of wheel system 812. In embodiments, support mechanism 815 may have a rotatable outer sleeve which allows inner support device 818 to rotate with support mechanism 815 when servo-motor 802 receives communications to rotate wheel system 812. In embodiments, inner support device 818 moves wheel system 812 up or down based on when apparatus 800 is needed to be in either a contracted or expanded state.

Thus, in embodiments, when apparatus 800 is transitioning from the expanded state to the contracted state, inner support device 818 would extend up as core 802 is lifted by support legs until the bottom of the wheels (of wheel system 812) are at a particular distance off the ground (such as a set distance based on the relationship between wheel system 812's ability to rotate between support legs). In embodiments, when apparatus 800 is transitioning from the contracted state to the expanded state, inner support device 818 would extend down as core 802 is lowered such that the wheels of wheel system 812 are in contact with the ground.

As shown in FIG. 8B, apparatus 800 is shown in an expanded state. As shown in FIG. 8B, when apparatus 800 is in the expanded state, the movement of core 802 results in straps 808A and 808B moving such that side 804A and 806B are pushed away from core 802. As side 804B is pushed away, this results in side 804A folding downward based on side 804A connected to 804B via the hinge. Furthermore, as strap 808A moves, strut 810A is also moved to move and connect to wheel system 812. In embodiments, strut 810A also acts as a shock absorber for wheel system 812 based on strut 810A having a flexing section.

Similarly, as side 806B is pushed away, this results in side 806A folding downward based on side 806A connected to 806B via the hinge. Furthermore, as strap 808B moves, strut 810B is also moved to move and connect to wheel system 812. In embodiments, strut 810B also acts as a shock absorber based on strut 810A having a flexing section.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 7, to complete such actions.

In the preceding specification, the term "axle" may be used to describe a system that includes a rod and wheels attached to each end of the rod. Furthermore, in the preceding specification, a leg may be used to describe a device that also include a moveable wheel. In the preceding specification, one or more features of a cart (e.g., apparatus 100, apparatus 200, apparatus 300, etc. as described in any of the figures) may be connected to a core (e.g., core 102) by bolting, screwing, soldering, and/or another type of attaching process that uses brackets, bolts, nuts, washers, screws, and/or other connecting devices that can be manufactured of metal, wood, plastic, or a composite material. Also, in the preceding specification, the number of support legs (e.g., legs 108) may be in varying amounts such that are only one at each corner, one leg at one corner and multiple legs at three corners, one leg at two corners and multiple legs (e.g., two, three, etc.) at the other two corners. Also, in the preceding specification, any apparatus may be of any measurement as long as the axles, actuators, legs, and side features can operate based on the above-described examples.

In the preceding specification, moving an apparatus from a contracted state to an expanded state is described within the context of movement of an axle in a clockwise direction; and moving from an expanded state to a contracted state is described within the context of a movement of an axle in a counter-clockwise direction. However, in alternate embodiments, when an apparatus moves from a contracted state to an expanded state may result in an axle to move in a counterclockwise direction; and moving the axle in a clockwise direction when an apparatus moves from an expanded state to a contracted state.

In the preceding specification, for any example apparatus (e.g., apparatus 100, 130, 300, 400 etc.), a directional device (such as a joystick, steering wheel, etc.) may be used to direct the apparatus to move in a particular direction and/or at a particular speed (with a brake or accelerator feature). Such a directional device may this allows the apparatus in the contracted state to be precisely navigated into and out of constricted spaces. Furthermore, such a directional device may be used to control speed and/or directional features of the apparatus in an expanded state. Alternatively, relocation of the apparatus in a compacted state, from one location (e.g., a storage location between two garaged cars) to a different location (e.g., immediately outside the garage, maybe accomplished using programming instructions.

In the preceding specification, an example apparatus (e.g., apparatus 100, 130, 300, 400, etc.) may include proximity sensors that prevent the apparatus from transitioning from one state to another if there is not sufficient space for the transition to occur and for preventing the apparatus from inadvertently contacting objects as it is moved in the contracted state from one location to another. In the preceding specification, to prevent any potential damage to objects near the apparatus, padding (e.g., non-abrasive pads) may be affixed to the outer surfaces and/or edges of the apparatus. In the preceding specification, a swivel device is different from a swivel wheel.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An apparatus, comprising:

a core;

multiple wheel systems, wherein, for each of the multiple wheel systems, a wheel is attached to each end of a rotatable axle and wherein each of the multiple wheel systems has a rod attached to the rotatable axle;

support legs, wherein:

the support legs are connected to the core, a horizontal-motion-enabling device is attached to at least one support leg, one pair of the support legs is at each of two or more corners of the core, and wherein each of the support legs is configured to:

extend downwards along a line of travel to provide vertical lift and support for the core, retract to lower the height of the core, and prevent interference with other operations of the apparatus;

sides, wherein the sides are connected to the core; and a computing device.

2. The apparatus of claim 1, wherein:

each rotatable axle is configured to rotate from a position other than perpendicular to the core's centerline to a position perpendicular to the core centerline, each support leg of each pair is configured to provide support for the core, together with other support legs, and to permit the rotation of each rotatable axle from a position other than perpendicular to the core's centerline to a position perpendicular to the core centerline, when the support legs are extended and retracted in a predetermined sequence.

3. The apparatus of claim 2, wherein:
each rotatable axle is also configured to rotate from a position perpendicular to the core centerline, towards a position parallel with the core centerline,
each of the support legs is configured not to touch the rotatable axle as it rotates from a position perpendicular to the core's centerline, towards a position parallel to the centerline.

4. The apparatus of claim 3, further comprising:
support actuators,
wherein each of the support legs is attached to a support actuator; and
side actuators,
wherein each of the side actuators is connected to each of the sides.

5. The apparatus of claim 4, wherein the side actuators are configured to extend and retract in a direction that is other than parallel to the core's centerline.

6. The apparatus of claim 1, further comprises;
a foldable section, wherein the foldable section connects the side to the core.

7. The apparatus of claim 6, wherein the foldable section attaches the side to the core via a hinge.

8. The apparatus of claim 7, wherein the foldable section is rigid when configured to be unfolded.

9. The apparatus of claim 8, wherein the foldable section includes a horizontally extending member that is configured to slide under the core when the foldable section is folded and is configured to slide away from the core when the foldable section is unfolded.

10. The apparatus of claim 1, wherein the computing device is configured to control movement of the sides, the rotatable axle, and the support legs in predetermined sequences.

11. The apparatus of claim 10, further comprising:
at least one sensor device that is configured to detect proximity of persons or objects, and powered horizontal-motion-imparting devices attached to more than one support leg.

12. The apparatus of claim 1, wherein the computing device is configured to:
receive an electronic command, and based on the electronic command:
move an axle,
wherein the axle is positioned other than perpendicular to the centerline of a core, and
wherein wheels of the axle are not contacting the ground;
moving, by the computing device, a first leg upwards towards the core, where the first leg is not already raised upwards towards the core;
move the axle between the first leg and a second leg;
move the first leg downwards away from the core;
move the second leg towards the core; and
move the axle past the second leg,
wherein the axle is located at the core's sides and is perpendicular to the core's centerline; and
retract support legs to lower the core and wherein the wheels of the axles contact the ground or floor.

13. The apparatus of claim 12, wherein the computing device is further configured to:
move a side away from the core as the axle is moved to a direction that is perpendicular to the core's center; and
unfold a foldable section to create a flat surface as the slide is moved away from the core.

14. The apparatus of claim 1, wherein the side is attached to the core via a hinge.

15. The apparatus of claim 12, wherein the computing device is further configured to:
receive another electronic command, and based on the other electronic command:
move an axle,
wherein the axle is positioned perpendicular to the centerline of a core, and
wherein wheels of the axle are contacting the ground;
extend support legs to raise the core and wheels off the ground;
move a second leg upwards towards the core;
move the axle between the second leg and a first leg;
move the second leg downwards away from the core;
move the first leg towards the core; and
move the axle past the first leg,
wherein the axle is located at a position other than perpendicular to the core's centerline.

16. The apparatus of claim 1, wherein each of the support legs is connected to an actuator, wherein each of the actuators is configured to move in a perpendicular direction to the core.

17. The apparatus of claim 16, wherein the actuator is attached to a servo-motor.

18. The apparatus of claim 17, wherein supports are connected to the sides.

19. The apparatus of claim 1, wherein the rod includes cylinders.

* * * * *